United States Patent
Rico Alvarino et al.

(10) Patent No.: US 10,911,192 B2
(45) Date of Patent: Feb. 2, 2021

(54) VOLTE OPTIMIZATIONS FOR EMTC DEVICES

(71) Applicant: QUALCOMM Incorporated, San Diego, CA (US)

(72) Inventors: Alberto Rico Alvarino, San Diego, CA (US); Kirankumar Bhoja Anchan, San Diego, CA (US); Shashidhar Vummintala, Bangalore (IN); Srinivasan Balasubramanian, San Diego, CA (US); Hao Xu, Beijing (CN); Parvathanathan Subrahmanya, Sunnyvale, CA (US); Seyed Ali Akbar Fakoorian, San Diego, CA (US); Peter Gaal, San Diego, CA (US); Gowrisankar Somichetty, Bangalore (IN)

(73) Assignee: QUALCOMM Incorporated, San Diego, CA (US)

(*) Notice: Subject to any disclaimer, the term of this patent is extended or adjusted under 35 U.S.C. 154(b) by 198 days.

(21) Appl. No.: 16/246,139

(22) Filed: Jan. 11, 2019

(65) Prior Publication Data

US 2019/0149284 A1    May 16, 2019

Related U.S. Application Data

(62) Division of application No. 15/647,114, filed on Jul. 11, 2017, now Pat. No. 10,218,475.

(30) Foreign Application Priority Data

Jul. 29, 2016   (IN) .............................. 201641025981

(51) Int. Cl.
*H04L 5/00* (2006.01)
*H04L 29/06* (2006.01)
(Continued)

(52) U.S. Cl.
CPC .......... *H04L 5/0037* (2013.01); *H04L 5/0091* (2013.01); *H04L 65/80* (2013.01);
(Continued)

(58) Field of Classification Search
CPC ... H04L 5/0055; H04L 1/1861; H04L 5/0053; H04L 1/1812; H04L 5/001; H04L 5/14
See application file for complete search history.

(56) References Cited

U.S. PATENT DOCUMENTS 10,218,475 B2    2/2019 Rico et al.
2009/0073958 A1    3/2009 Xu
(Continued)

OTHER PUBLICATIONS

Nokia et al. "L1 control signaling with carrier aggregation in LTEAdvanced",3GPP Draft; R1-083730, 3rd Generation Partnership Project (3GPP), Sep. 24, 2008. (Year: 2008).*
(Continued)

*Primary Examiner* — Ross Varndell
(74) *Attorney, Agent, or Firm* — Patterson + Sheridan, LLP

(57) ABSTRACT

Aspects of the present disclosure relate to methods and apparatus for optimizing real time services (e.g., such as a voice over Long Term Evolution (LTE) (VoLTE)) for devices with limited communications resources, such as machine type communication (MTC) devices and enhanced MTC (eMTC) devices. In one aspect, a UE determines a first configuration of subframes within at least one radio frame available for the UE and other UEs to use for bundled communications with a BS. The UE receives an indication of one or more subframes within the at least one radio frame that are unavailable for bundled uplink transmissions, and determines a second configuration of subframes to use for bundled communications based on the indication. The UE overrides the first configuration of subframes with the sec-
(Continued)

ond configuration of subframes, and communicates with the BS using the second configuration of subframes. Numerous other aspects are provided.

10 Claims, 18 Drawing Sheets

(51) Int. Cl.
  *H04W 72/12* (2009.01)
  *H04W 72/14* (2009.01)
(52) U.S. Cl.
  CPC ......... *H04W 72/121* (2013.01); *H04W 72/14* (2013.01); *H04L 5/0007* (2013.01); *H04L 5/0053* (2013.01)

(56) References Cited

U.S. PATENT DOCUMENTS

| | | | |
|---|---|---|---|
| 2012/0122465 | A1 | 5/2012 | Landstroem et al. |
| 2014/0016582 | A1 | 1/2014 | Prakash et al. |
| 2015/0237644 | A1 | 8/2015 | Golitschek et al. |
| 2018/0034604 | A1 | 2/2018 | Rico et al. |

OTHER PUBLICATIONS

European Search Report—EP19212489—Search Authority—The Hague—dated Feb. 19, 2020.
European Search Report—EP19212491—Search Authority—The Hague—dated Feb. 19, 2020.
Ericsson: "Uplink Power Control for E-UTRA—Comments on Open Issues (update of R1-074378)", 3GPP Draft; R1-074470 {UL PC}, 3rd Generation Partnership Project (3GPP), Mobile Competence Centre, 650, Route Des Lucioles, F-06921, Sophia-Antipolis Cedex, France, vol. RAN WG1, No. Shanghai, China; Oct. 15, 2007, XP050488665, [retrieved on Oct. 15, 2007], 9 pages.
Huawei et al., "Enhancements to DL Control Signalling for up to 32 Component Carriers", 3GPP Draft; R1-151867, 3rd Generation Partnership Project (3GPP), Mobile Competence Centre, 650, Route Des Lucioles, F-06921, Sophia-Antipolis Cedex, France, vol. RAN WG1, No. Belgrade, Serbia; Apr. 19, 2015, XP050934725, Retrieved from the Internet: URL:http://www.3gpp.org/ftp/Meetings_3GPP_SYNC/RAN1/Docs/ [retrieved on Apr. 19, 2015], 4 pages.
International Search Report and Written Opinion—PCT/US2017/041688—ISA/EPO—dated Dec. 11, 2017.
Nokia et al., "L1 control signaling with carrier aggregation in LTE-Advanced", 3GPP Draft; R1-083730, 3rd Generation Partnership Project (3GPP), Mobile Competence Centre; 650, Route Des Lucioles; F-06921 Sophia-Antipolis Cedex; France, No. Prague, Czech Republic; Sep. 24, 2008, Sep. 24, 2008 (Sep. 24, 2008), 7 pages, XP050317069, [retrieved on Sep. 24, 2008].
Partial International Search Report—PCT/US2017/041688—ISA/EPO—dated Sep. 20, 2017.
Qualcomm Incorporated: "VoLTE Enhancements for eMTC", 3GPP Draft; R1-1609997, 3rd Generation Partnership Project (3GPP), Mobile Competence Centre, 650, Route Des Lucioles, F-06921, Sophia-Antipolis Cedex, France, vol. RAN WG1, Lisbon, Portugal; Oct. 9, 2016, XP051150022, Retrieved from the Internet: URL:http://www.3gpp.org/ftp/Meetings_3GPP_SYNC/RAN1/Docs/ [retrieved on Oct. 9, 2016], 5 pages.

\* cited by examiner

VOLTE OPTIMIZATIONS FOR EMTC DEVICES

CROSS-REFERENCE TO RELATED APPLICATIONS

This application is a divisional of U.S. patent application Ser. No. 15/647,114, filed Jul. 11, 2017, which claims the benefit of Indian Provisional Patent Application Serial No. 201641025981, filed Jul. 29, 2016, each of which is assigned to the assignee hereof and hereby expressly incorporated by reference herein.

BACKGROUND

I. Field of the Disclosure

Certain aspects of the present disclosure generally relate to wireless communications and more particularly, to methods and apparatus for optimizing real time services (e.g., such as a voice over Long Term Evolution (LTE) (VoLTE)) for devices with limited communications resources, such as machine type communication(s) (MTC) devices and enhanced MTC (eMTC) devices.

II. Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some UEs may be considered machine type communication (MTC) UEs that may communicate with a base station, another remote device, or some other entity. Machine type communications (MTC) may refer to communication involving at least one remote device on at least one end of the communication and may include forms of communication which involve one or more entities that do not necessarily need human interaction. MTC UEs may include UEs that are capable of MTC communications with MTC servers and/or other MTC devices through Public Land Mobile Networks (PLMN), for example.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

The present disclosure relates generally to wireless communication, and more particularly, to methods and apparatus for optimizing real time services (e.g., such as a voice service over long term evolution (LTE) (VoLTE)) for devices with limited communications resources, such as MTC devices and eMTC devices.

Certain aspects of the present disclosure provide a method for wireless communications performed by a base station (BS). The method generally includes determining a first configuration of one or more subframes within at least one radio frame available for a plurality of user equipments (UEs) to use for bundled communications with the BS. The method also includes determining, for a subset of the plurality of UEs, one or more subframes in the at least one radio frame that are unavailable for bundled uplink transmissions from the subset of UEs. The method further includes transmitting an indication of the determined unavailable subframes to the subset of UEs in order to override the first configuration of subframes with a second configuration of one or more subframes, within the at least one radio frame, for the subset of UEs to use for bundled communications with the BS. The method further includes communicating with the subset of UEs using the second configuration of subframes.

Certain aspects of the present disclosure provide an apparatus for wireless communications. The apparatus generally includes at least one processor, and a memory coupled to the at least one processor. The at least one processor is configured to determine a first configuration of one or more subframes within at least one radio frame available for a plurality of UEs to use for bundled communications with the apparatus. The at least one processor is also configured to determine, for a subset of the plurality of UEs, one or more subframes in the at least one radio frame that are unavailable for bundled uplink transmissions from the subset of UEs. The at least one processor is further configured to transmit an indication of the determined unavailable subframes to the subset of UEs in order to override the first configuration of subframes with a second configuration of one or more subframes, within the at least one radio frame, for the subset of UEs to use for bundled communications with the apparatus. The at least one processor is further configured to communicate with the subset of UEs using the second configuration of subframes.

Certain aspects of the present disclosure provide an apparatus for wireless communications. The apparatus generally includes means for determining a first configuration of one or more subframes within at least one radio frame available for a plurality of UEs to use for bundled communications with the apparatus. The apparatus also includes means for determining, for a subset of the plurality of UEs, one or more subframes in the at least one radio frame that are unavailable for bundled uplink transmissions from the subset of UEs. The apparatus further includes means for transmitting an indication of the determined unavailable subframes to the subset of UEs in order to override the first configuration of subframes with a second configuration of one or more subframes, within the at least one radio frame, for the subset of UEs to use for bundled communications with the apparatus. The apparatus further includes means for communicating with the subset of UEs using the second configuration of subframes.

Certain aspects of the present disclosure provide a computer-readable medium having computer executable code stored thereon. The computer executable code generally includes code for determining, by a BS, a first configuration of one or more subframes within at least one radio frame available for a plurality of UEs to use for bundled communications with the BS. The computer executable code also includes code for determining, by the BS for a subset of the plurality of UEs, one or more subframes in the at least one radio frame that are unavailable for bundled uplink transmissions from the subset of UEs. The computer executable code further includes code for transmitting, by the BS, an indication of the determined unavailable subframes to the subset of UEs in order to override the first configuration of subframes with a second configuration of one or more subframes, within the at least one radio frame, for the subset of UEs to use for bundled communications with the BS. The computer executable code further includes code for communicating by the BS with the subset of UEs using the second configuration of subframes.

Certain aspects of the present disclosure provide a method for wireless communications performed by a UE. The method generally includes determining a first configuration of one or more subframes within at least one radio frame available for the UE and one or more other UEs to use for bundled communications with a BS. The method also includes receiving an indication of one or more subframes within the at least one radio frame that are unavailable for bundled uplink transmissions by the UE, and determining a second configuration of one or more subframes, within the at least one radio frame, for the UE to use for bundled communications with the BS based at least in part on the received indication. The method further includes overriding the first configuration of subframes with the second configuration of one or more subframes, and communicating with the BS using the determined second configuration of subframes.

Certain aspects of the present disclosure provide an apparatus for wireless communications. The apparatus generally includes at least one processor, and a memory coupled to the at least one processor. The at least one processor is configured to determine a first configuration of one or more subframes within at least one radio frame available for the apparatus and one or more other apparatuses to use for bundled communications with a BS. The at least one processor is also configured to receive an indication of one or more subframes within the at least one radio frame that are unavailable for bundled uplink transmissions by the apparatus, and determine a second configuration of one or more subframes, within the at least one radio frame, for the apparatus to use for bundled communications with the BS based at least in part on the received indication. The at least one processor is further configured to override the first configuration of subframes with the second configuration of one or more subframes, and communicate with the BS using the determined second configuration of subframes.

Certain aspects of the present disclosure provide an apparatus for wireless communications. The apparatus generally includes means for determining a first configuration of one or more subframes within at least one radio frame available for the apparatus and one or more other apparatuses to use for bundled communications with a BS. The apparatus also includes means for receiving an indication of one or more subframes within the at least one radio frame that are unavailable for bundled uplink transmissions by the apparatus, and means for determining a second configuration of one or more subframes, within the at least one radio frame, for the apparatus to use for bundled communications with the BS based at least in part on the received indication. The apparatus further includes means for overriding the first configuration of subframes with the second configuration of one or more subframes, and means for communicating with the BS using the determined second configuration of subframes.

Certain aspects of the present disclosure provide a computer-readable medium having computer executable code stored thereon. The computer executable code generally includes code for determining, by a UE, a first configuration of one or more subframes within at least one radio frame available for the UE and one or more other UEs to use for bundled communications with a BS. The computer executable code also includes code for receiving, by the UE, an indication of one or more subframes within the at least one radio frame that are unavailable for bundled uplink transmissions by the UE, and code for determining, by the UE, a second configuration of one or more subframes, within the at least one radio frame, for the UE to use for bundled communications with the BS based at least in part on the received indication. The computer executable code further includes code for overriding, by the UE, the first configuration of subframes with the second configuration of one or more subframes, and code for communicating, by the UE, with the BS using the determined second configuration of subframes.

Certain aspects of the present disclosure provide a method for wireless communications performed by a BS. The method generally includes determining, for communications with a subset of a plurality of UEs, a grant that schedules one or more bundled downlink transmissions from the BS and one or more bundled uplink transmissions from the subset of UEs. The method also includes transmitting the grant to the subset of UEs in one subframe of a plurality of subframes within at least one radio frame. The method further includes communicating with the subset of UEs based at least in part on the grant.

Certain aspects of the present disclosure provide an apparatus for wireless communications. The apparatus generally includes at least one processor, and a memory coupled to the at least one processor. The at least one processor is configured to determine, for communications with a subset of a plurality of UEs, a grant that schedules one or more bundled downlink transmissions from the apparatus and one or more bundled uplink transmissions from the subset of UEs. The at least one processor is also configured to transmit the grant to the subset of UEs in one subframe of a plurality of subframes within at least one radio frame. The at least one processor is further configured to communicate with the subset of UEs based at least in part on the grant.

Certain aspects of the present disclosure provide an apparatus for wireless communications. The apparatus generally includes means for determining, for communications with a subset of a plurality of UEs, a grant that schedules one or more bundled downlink transmissions from the apparatus and one or more bundled uplink transmissions from the subset of UEs. The apparatus also includes means for transmitting the grant to the subset of UEs in one subframe of a plurality of subframes within at least one radio frame.

The apparatus further includes means for communicating with the subset of UEs based at least in part on the grant.

Certain aspects of the present disclosure provide a computer-readable medium having computer executable code stored thereon. The computer executable code generally includes code for determining, by a BS for communications with a subset of a plurality of UEs, a grant that schedules one or more bundled downlink transmissions from the BS and one or more bundled uplink transmissions from the subset of UEs. The computer executable code also includes code for transmitting, by the BS, the grant to the subset of UEs in one subframe of a plurality of subframes within at least one radio frame. The computer executable code further includes code for communicating, by the BS, with the subset of UEs based at least in part on the grant.

Certain aspects of the present disclosure provide a method for wireless communications performed by a UE. The method generally includes receiving, for communications with a BS, in one subframe of a plurality of subframes within at least one radio frame, a grant for bundled downlink transmissions from the BS and bundled uplink transmissions from the UE. The method further includes communicating with the BS based on the received grant.

Certain aspects of the present disclosure provide an apparatus for wireless communications. The apparatus generally includes at least one processor, and a memory coupled to the at least one processor. The at least one processor is configured to receive, for communications with a BS, in one subframe of a plurality of subframes within at least one radio frame, a grant for bundled downlink transmissions from the BS and bundled uplink transmissions from the apparatus. The at least one processor is further configured to communicate with the BS based on the received grant.

Certain aspects of the present disclosure provide an apparatus for wireless communications. The apparatus generally includes means for receiving, for communications with a BS, in one subframe of a plurality of subframes within at least one radio frame, a grant for bundled downlink transmissions from the BS and bundled uplink transmissions from the apparatus. The apparatus further includes means for communicating with the BS based on the received grant.

Certain aspects of the present disclosure provide a computer-readable medium having computer executable code stored thereon. The computer executable code generally includes code for receiving, by a UE for communications with a BS, in one subframe of a plurality of subframes within at least one radio frame, a grant for bundled downlink transmissions from the BS and bundled uplink transmissions from the UE. The computer executable code further includes code for communicating, by the UE, with the BS based on the received grant.

Certain aspects of the present disclosure provide a method for wireless communications performed by a BS. The method generally includes receiving, during communications with a UE, one or more bundled uplink transmissions from the UE without a silence insertion descriptor (SID) frame. The method further includes determining whether the bundled uplink transmissions include a physical uplink control channel (PUCCH) transmitted from the UE. The method further includes deciding whether to continue communicating with the UE based on the determination.

Certain aspects of the present disclosure provide an apparatus for wireless communications. The apparatus generally includes at least one processor, and a memory coupled to the at least one processor. The at least one processor is configured to receive, during communications with a UE, one or more bundled uplink transmissions from the UE without a silence insertion descriptor (SID) frame. The at least one processor is further configured to determine whether the bundled uplink transmissions include a physical uplink control channel (PUCCH) transmitted from the UE. The at least one processor is further configured to decide whether to continue communicating with the UE based on the determination.

Certain aspects of the present disclosure provide an apparatus for wireless communications. The apparatus generally includes means for receiving, during communications with a UE, one or more bundled uplink transmissions from the UE without a silence insertion descriptor (SID) frame. The apparatus further includes means for determining whether the bundled uplink transmissions include a physical uplink control channel (PUCCH) transmitted from the UE. The apparatus further includes means for deciding whether to continue communicating with the UE based on the determination.

Certain aspects of the present disclosure provide a computer-readable medium having computer executable code stored thereon. The computer executable code generally includes code for receiving, by a BS during communications with a UE, one or more bundled uplink transmissions from the UE without a silence insertion descriptor (SID) frame. The computer executable code further includes code for determining, by the BS, whether the bundled uplink transmissions include a physical uplink control channel (PUCCH) transmitted from the UE. The computer executable code further includes code for deciding, by the BS, whether to continue communicating with the UE based on the determination.

Certain aspects of the present disclosure provide a method for wireless communications performed by a UE. The method generally includes transmitting, during communications with a BS, one or more bundled uplink transmissions to the BS without a silence insertion descriptor (SID) frame. The method further includes transmitting a physical uplink control channel (PUCCH) within the bundled uplink transmissions to indicate that the UE is connected to the BS via the communications.

Certain aspects of the present disclosure provide an apparatus for wireless communications. The apparatus generally includes at least one processor, and a memory coupled to the at least one processor. The at least one processor is configured to transmit, during communications with a BS, one or more bundled uplink transmissions to the BS without a silence insertion descriptor (SID) frame. The at least one processor is further configured to transmit a physical uplink control channel (PUCCH) within the bundled uplink transmissions to indicate that the apparatus is connected to the BS via the communications.

Certain aspects of the present disclosure provide an apparatus for wireless communications. The apparatus generally includes means for transmitting, during communications with a BS, one or more bundled uplink transmissions to the BS without a silence insertion descriptor (SID) frame. The apparatus further includes means for transmitting a physical uplink control channel (PUCCH) within the bundled uplink transmissions to indicate that the apparatus is connected to the BS via the communications.

Certain aspects of the present disclosure provide a computer-readable medium having computer executable code stored thereon. The computer executable code generally includes code for transmitting, by a UE during communications with a BS, one or more bundled uplink transmissions to the BS without a silence insertion descriptor (SID) frame. The computer executable code further includes code for transmitting, by the UE, a physical uplink control channel (PUCCH) within the bundled uplink transmissions to indicate that the UE is connected to the BS via the communications.

Other aspects, features, and aspects of the present disclosure will become apparent to those of ordinary skill in the art, upon reviewing the following description of specific, exemplary aspects of the present disclosure in conjunction with the accompanying figures. While features of the present disclosure may be discussed relative to certain aspects and figures below, all aspects of the present disclosure can include one or more of the advantageous features discussed herein. In other words, while one or more aspects may be discussed as having certain advantageous features, one or more of such features may also be used in accordance with the various aspects of the invention disclosure herein. In similar fashion, while exemplary aspects may be discussed below as device, system, or method aspects it should be understood that such exemplary aspects can be implemented in various devices, systems, methods, and computer readable media.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
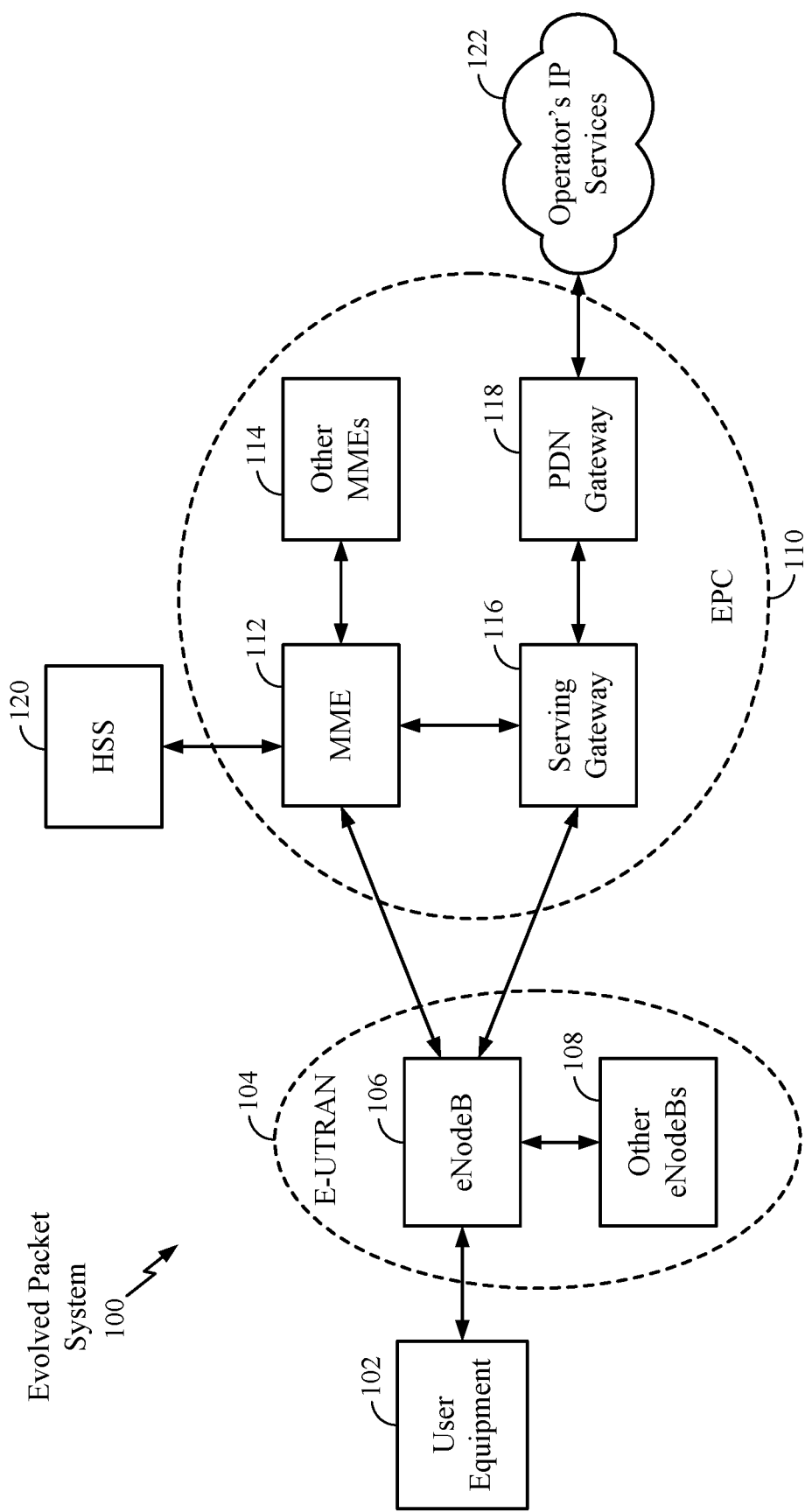
FIG. 1 is a diagram illustrating an example of a network architecture, in accordance with certain aspects of the disclosure.

Aspects of the present disclosure discuss techniques for optimizing real time services (e.g., such as a voice service over long term evolution (LTE) (VoLTE)) for devices with limited communications resources, such as MTC devices and eMTC devices.

According to certain aspects, a BS may determine a first subframe configuration for UEs to use for bundled communications with the BS. Such subframe configuration, for example, may be a cell-specific configuration that is supported by different types of UEs (e.g., legacy UEs, advanced UEs, MTC UEs, etc.) in the network, and may specify which subframes in one or more radio frames are available (or valid) for uplink transmissions by the UEs and which subframes in the one or more radio frames are available for monitoring for downlink transmissions from the BS. The BS may determine, for a subset of UEs in the network, one or more subframes that are unavailable (or not valid) for bundled uplink transmissions from the subset of UEs. The BS may transmit an indication of the determined unavailable subframes to the subset of UEs.

The subset of UEs may determine a second subframe configuration for the subset of UEs to use for bundled communications with the BS based at least in part on the received indication. The subset of UEs may override the first subframe configuration with the second subframe configuration. The BS and the subset of UEs may then communicate using the second subframe configuration. In one example, the communication may include participating in a real time service (e.g., such as VoLTE call) using the second subframe configuration.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspect. Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some implementations, an UE may comprise a cellular telephone, a smart phone, a cordless telephone, a Session Initiation Protocol ("SIP") phone, a wireless local loop ("WLL") station, wireless modems, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, virtual reality goggles, smart bracelet, smart wristband, smart ring, smart clothing, etc.), medical devices or equipment, healthcare device or equipment, biometric sensors/devices, an entertainment device (e.g., music device, video device, satellite radio, gaming device, etc.), a drone, a robot/robotic device, a vehicular component or sensor, smart meters/sensors, industrial manufacturing equipment, a positioning or position location device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. To enhance coverage of certain devices, such as MTC devices, "bundling" may be utilized in which certain transmissions are sent as a bundle of transmissions, for example, with the same information transmitted over multiple subframes. MTC UEs may include UEs that are capable of MTC communications with MTC servers and/or other MTC devices through Public Land Mobile Networks (PLMN), for example. Examples of MTC devices include sensors, meters, location tags, monitors, trackers, drones, robots/robotic devices, etc. MTC type UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later.

FIG. 1 is a diagram illustrating a network architecture 100 in which aspects of the present disclosure may be practiced. For example, the UE 102 can establish a connection with eNB 106 in order to participate in a real time service with eNB 106. Such real time service, for example, can be a voice call that is delivered over IP via an LTE access network 104 (e.g., VoLTE call), video service delivered over an LTE access network 104, etc. As described in more detail below, such real time service can be optimized using one or more techniques described herein.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, as shown in FIG. 1A. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. In aspects, an exemplary access network may include an access network for VoIP Voice Traffic. The EPS 100 provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102.

Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, a drone, a robot, a sensor, a monitor, a meter, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMES 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE102 may be coupled to the PDN through the LTE network.

One or more UEs 102 in EPS 100 may also be low cost (LC), low data rate devices, e.g., such as LC MTC UEs, LC eMTC UEs, etc. The LC UEs may co-exist with legacy and/or advanced UEs in the LTE network and may have one or more capabilities that are limited when compared to the other UEs (e.g., non-LC UEs) in the wireless network. For example, when compared to legacy and/or advanced UEs in the LTE network, the LC UEs may operate with one or more of the following: a reduction in maximum bandwidth (relative to legacy UEs), a single receive radio frequency (RF) chain, reduction of peak rate, reduction of transmit power, rank 1 transmission, half duplex operation, etc. As used herein, devices with limited communication resources, such as MTC devices, eMTC devices, etc. are referred to generally as LC UEs. Similarly, legacy devices, such as legacy and/or advanced UEs (e.g., in LTE) are referred to generally as non-LC UEs.

Figure 2:
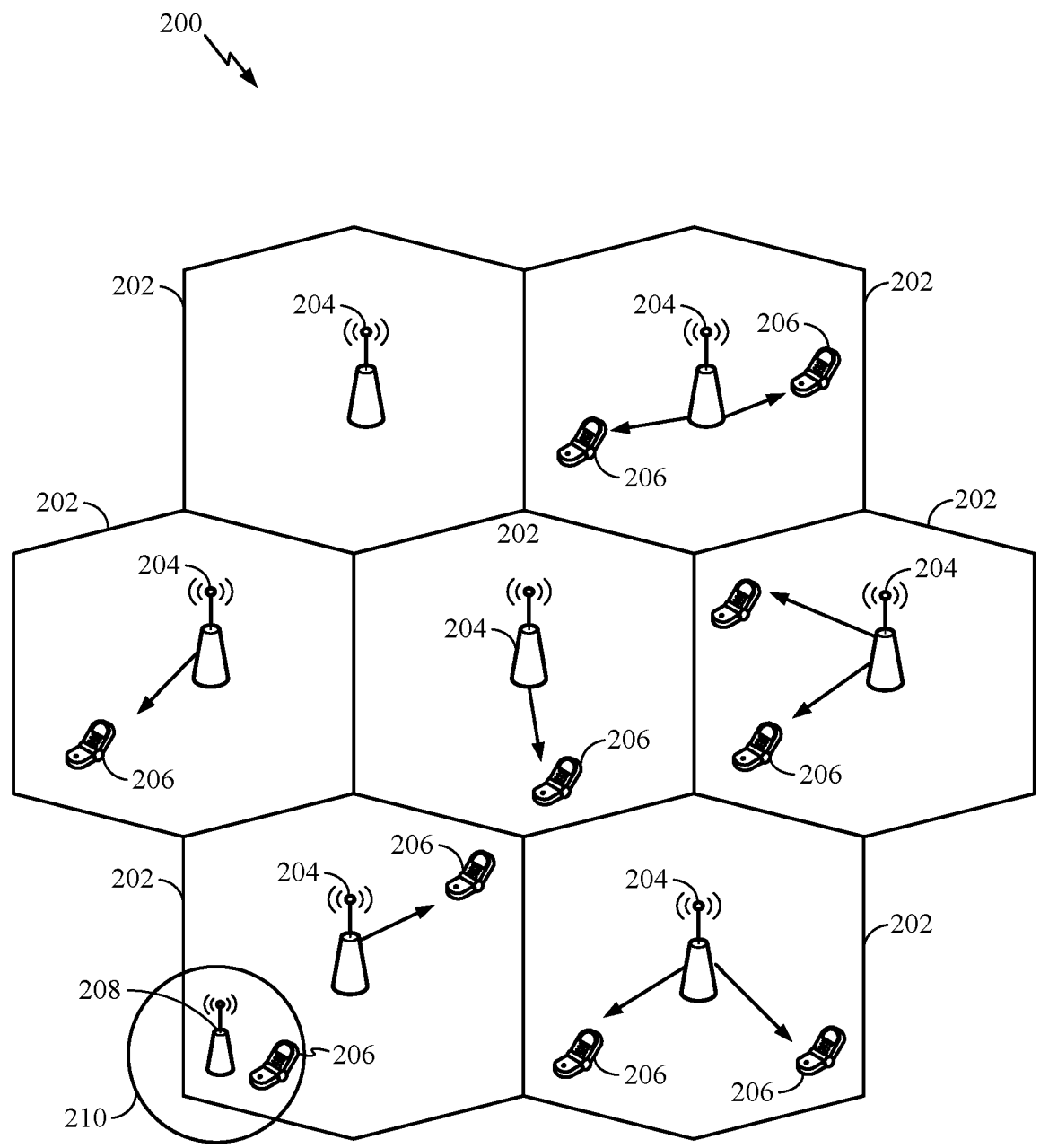
FIG. 2 is a diagram illustrating an example of an access network, in accordance with certain aspects of the disclosure.

FIG. 2 is a diagram illustrating an example of an access network 200 in an LTE network architecture in which aspects of the present disclosure may be practiced. For example, devices such as eNB 106 and/or LC UEs (e.g., UE 102) can be configured to implement techniques that optimize real time services, such as VoLTE.

In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including bearer control, admission control, mobility control, scheduling, security, and connectivity to the serving gateway 116. The network 200 may also include one or more relays (not shown). According to one application, a UE may serve as a relay.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
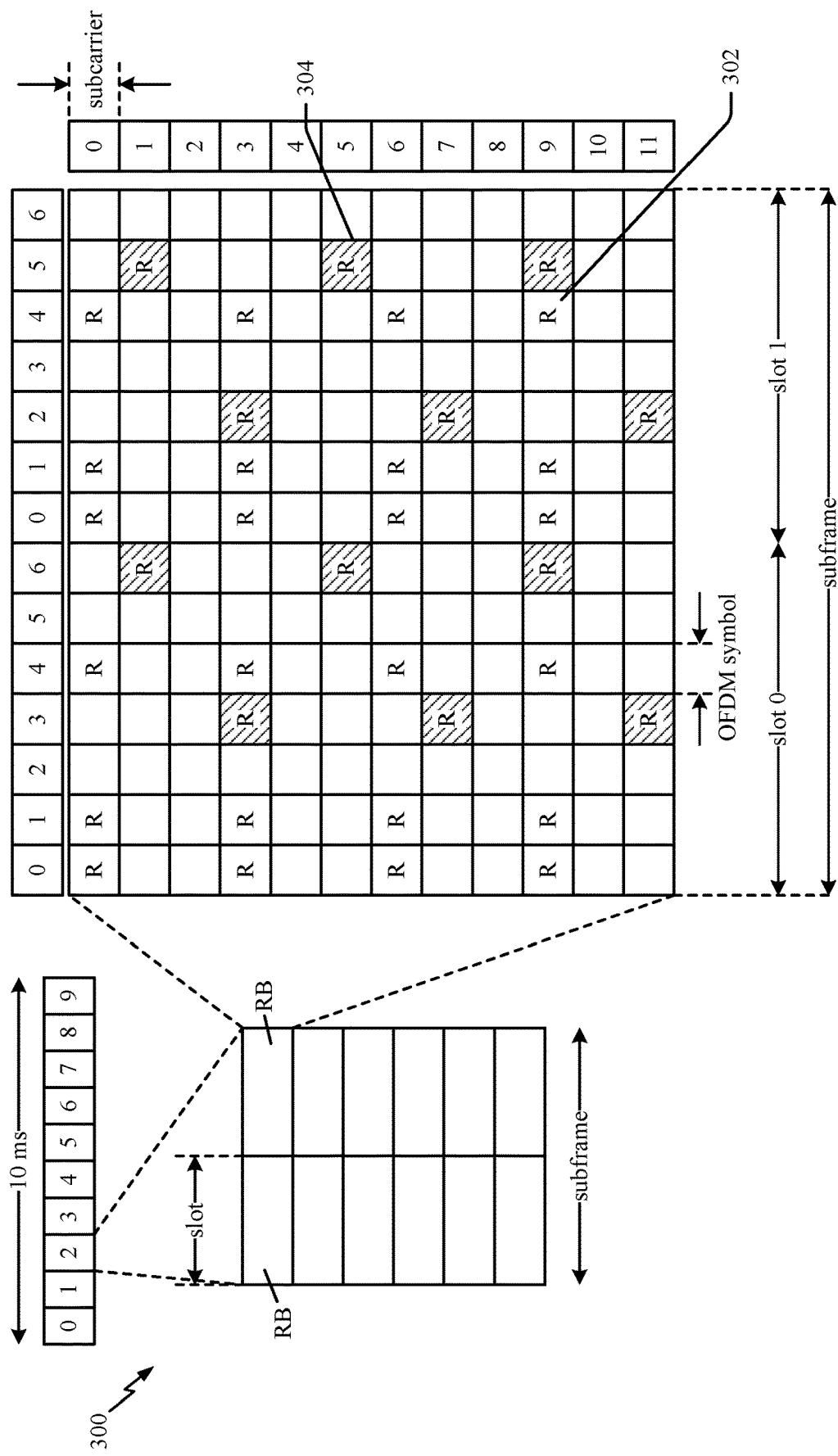
FIG. 3 is a diagram illustrating an example of a downlink frame structure in long term evolution (LTE), in accordance with certain aspects of the disclosure.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
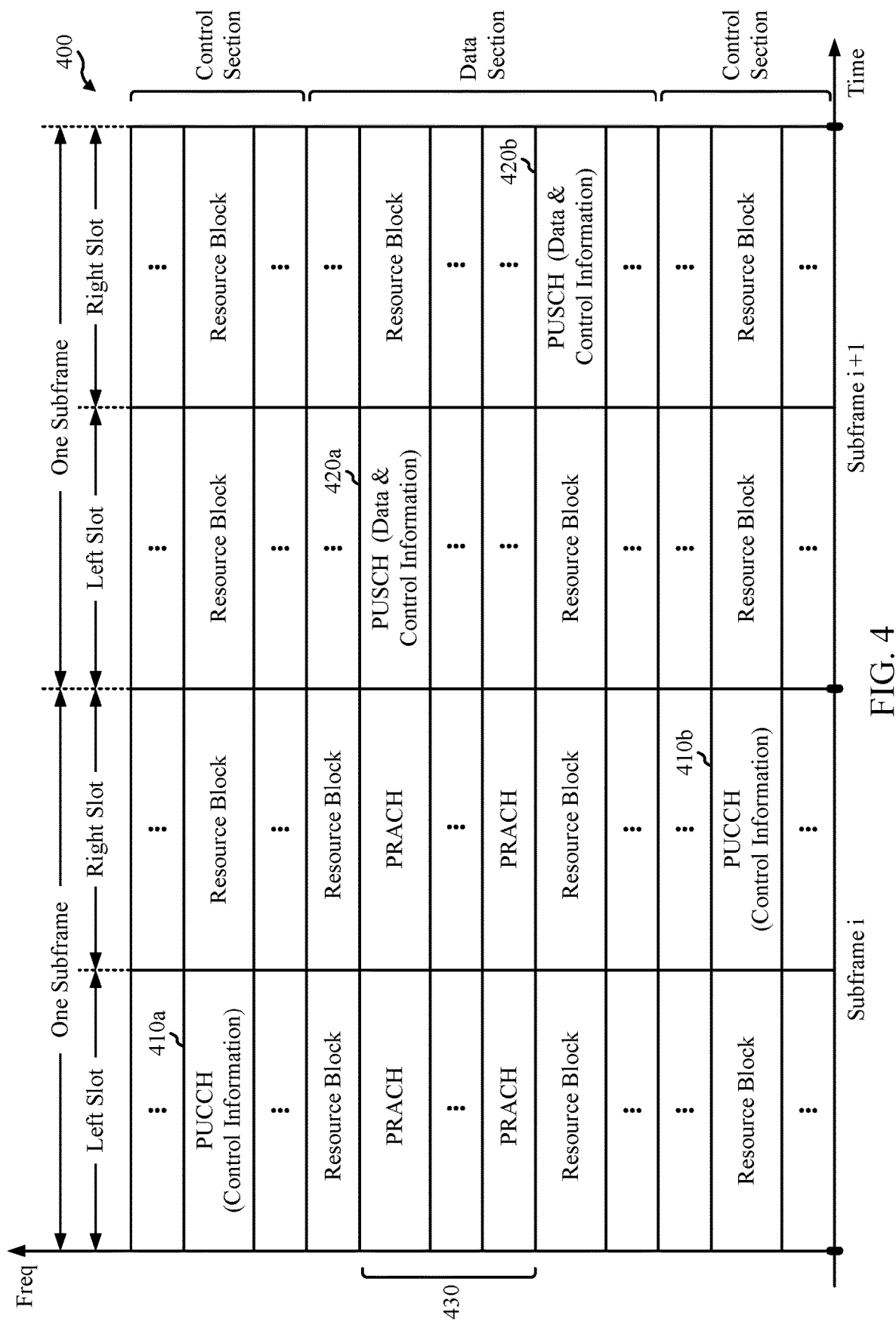
FIG. 4 is a diagram illustrating an example of an uplink frame structure in LTE, in accordance with certain aspects of the disclosure.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
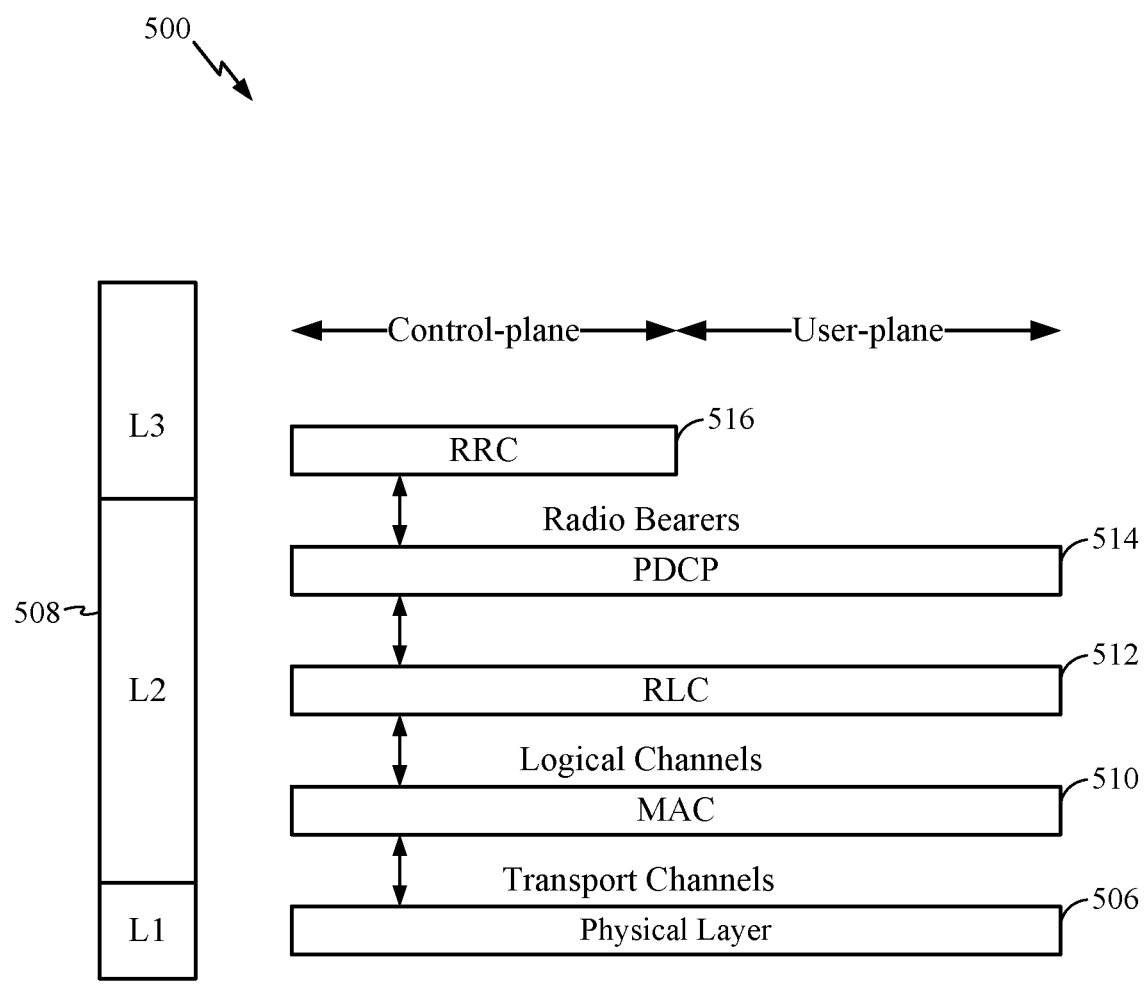
FIG. 5 is a diagram illustrating an example of a radio protocol architecture for the user and control plane, in accordance with certain aspects of the disclosure.

FIG. 5 is a diagram 500 illustrating an example of a radio protocol architecture for the user and control planes in LTE.

The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
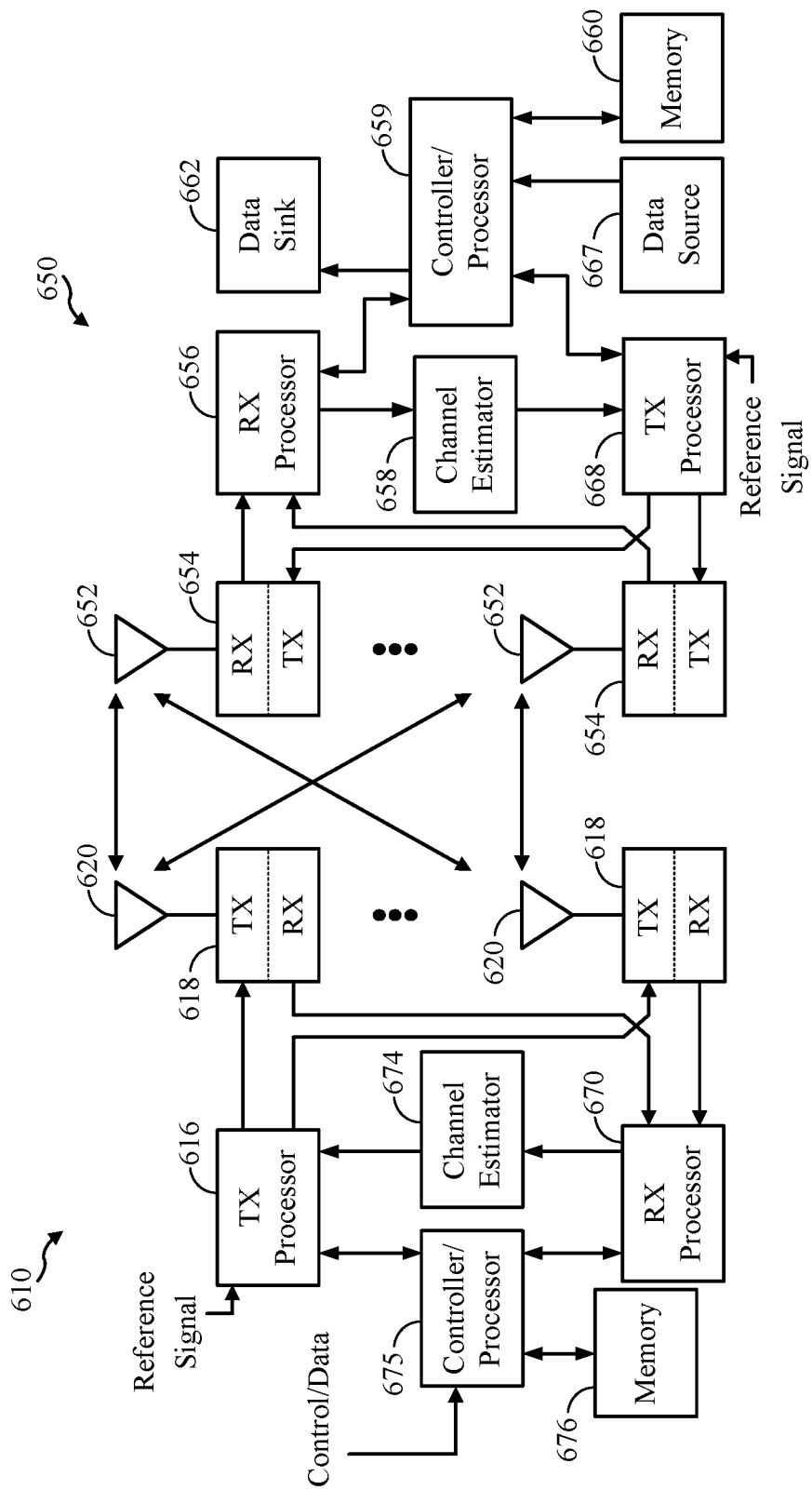
FIG. 6 is a diagram illustrating an example of an evolved Node B (eNB) and user equipment (UE) in an access network, in accordance with certain aspects of the disclosure.

FIG. 6 is a block diagram of an eNB 610 in communication with a UE 650 in an access network, in which aspects of the present disclosure may be practiced.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operations at the eNB 610 and the UE 650, respectively.

Figure 11:
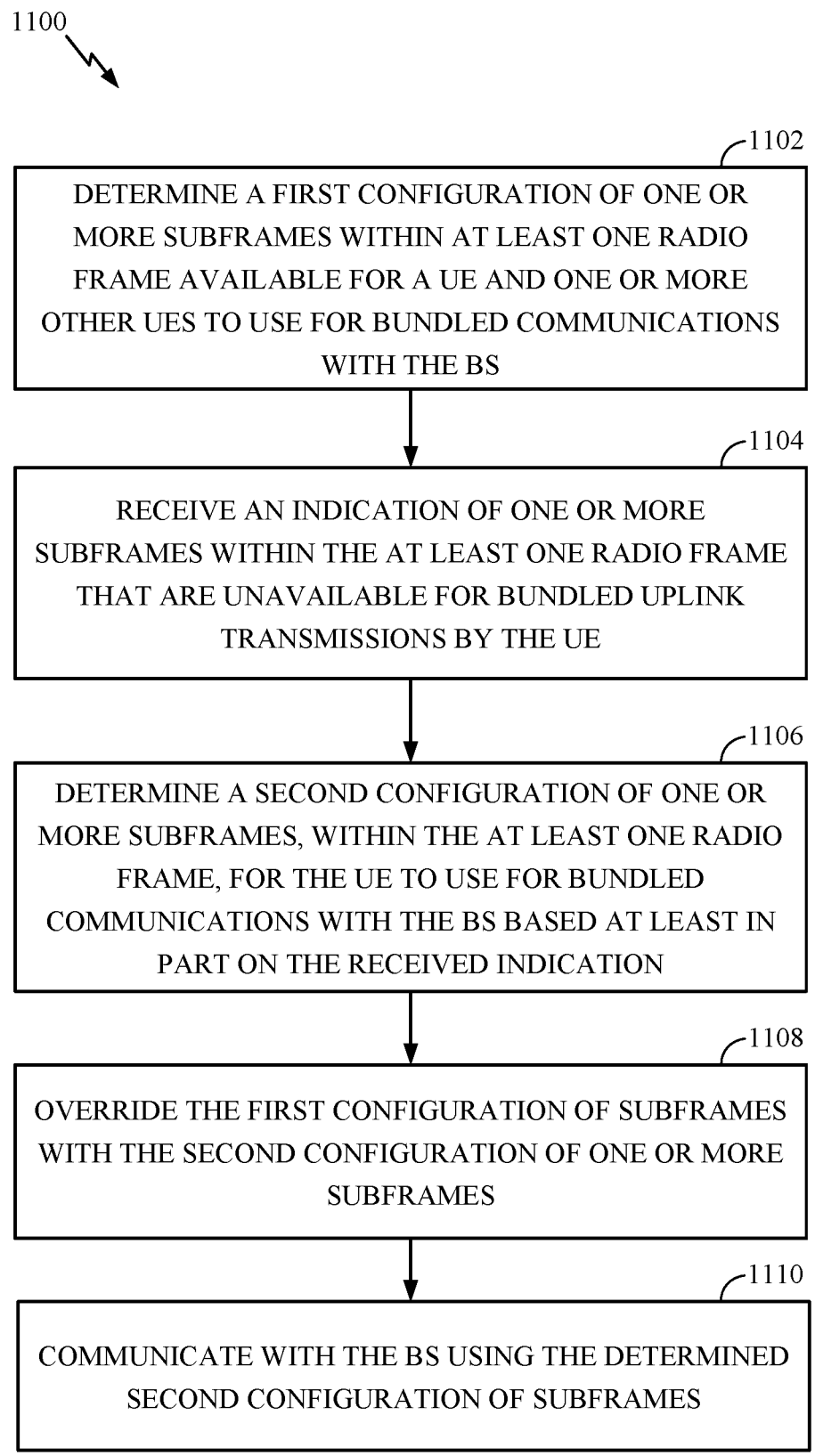
FIG. 11 is a flow diagram illustrating example operations for wireless communications by a user equipment (UE), in accordance with certain aspects of the present disclosure.
Figure 14:
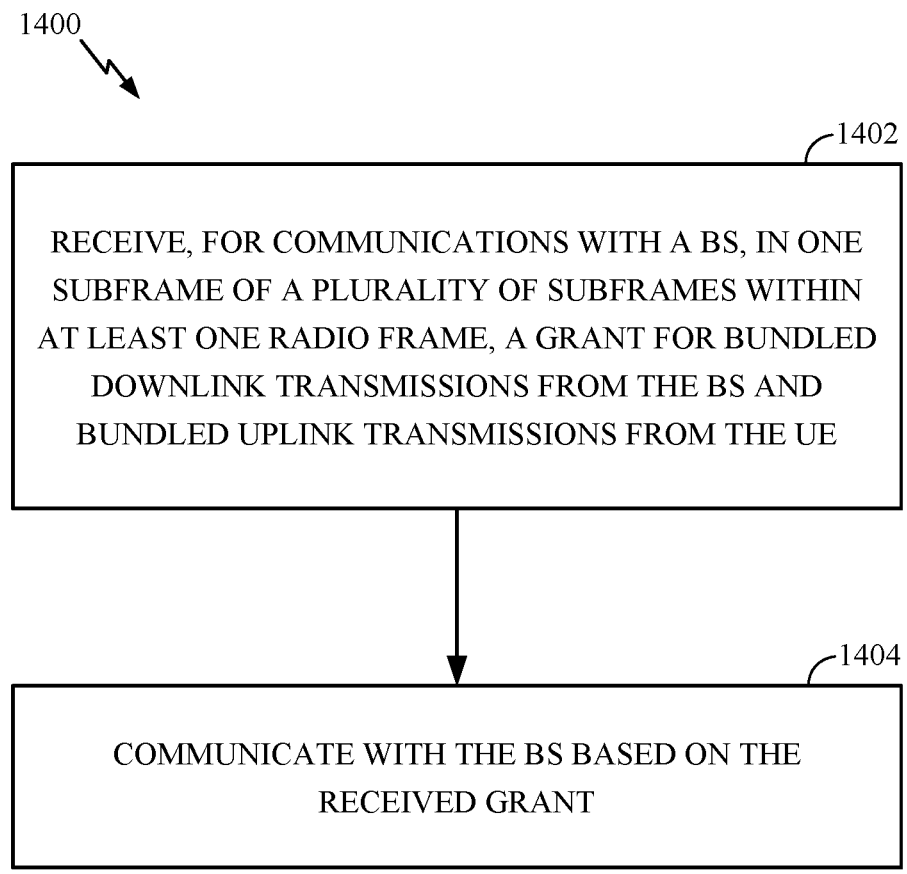
FIG. 14 is a flow diagram illustrating example operations for wireless communications by a UE, in accordance with certain aspects of the present disclosure.
Figure 17:
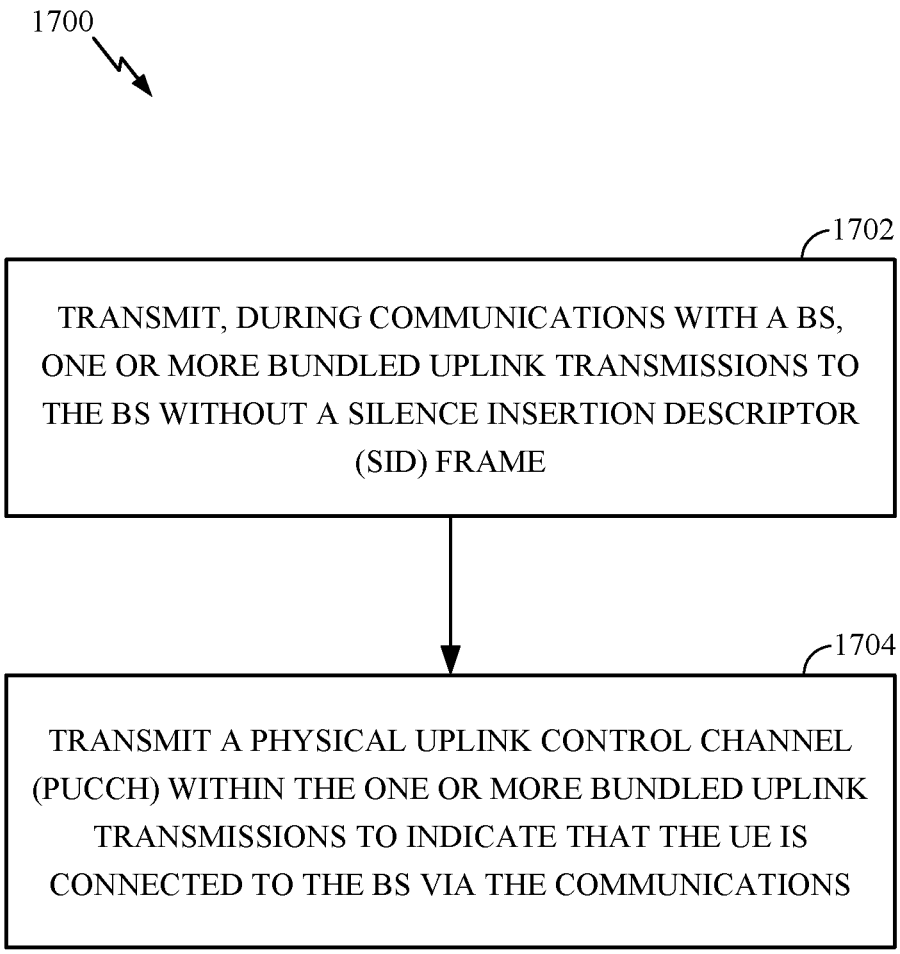
FIG. 17 is a flow diagram illustrating example operations for wireless communications by a UE, in accordance with certain aspects of the present disclosure.

The controller/processor 659 and/or other processors, components and/or modules at the UE 650 may perform or direct operations, for example, operations 1100 in FIG. 11, operations 1400 in FIG. 14, and operations 1700 in FIG. 17, and/or other processes for the techniques described herein for optimizing VoLTE operations. In certain aspects, one or more of any of the components shown in FIG. 6 may be employed to perform example operations 1100, operations 1400, operations 1700 and/or other processes for the techniques described herein.

Figure 10:
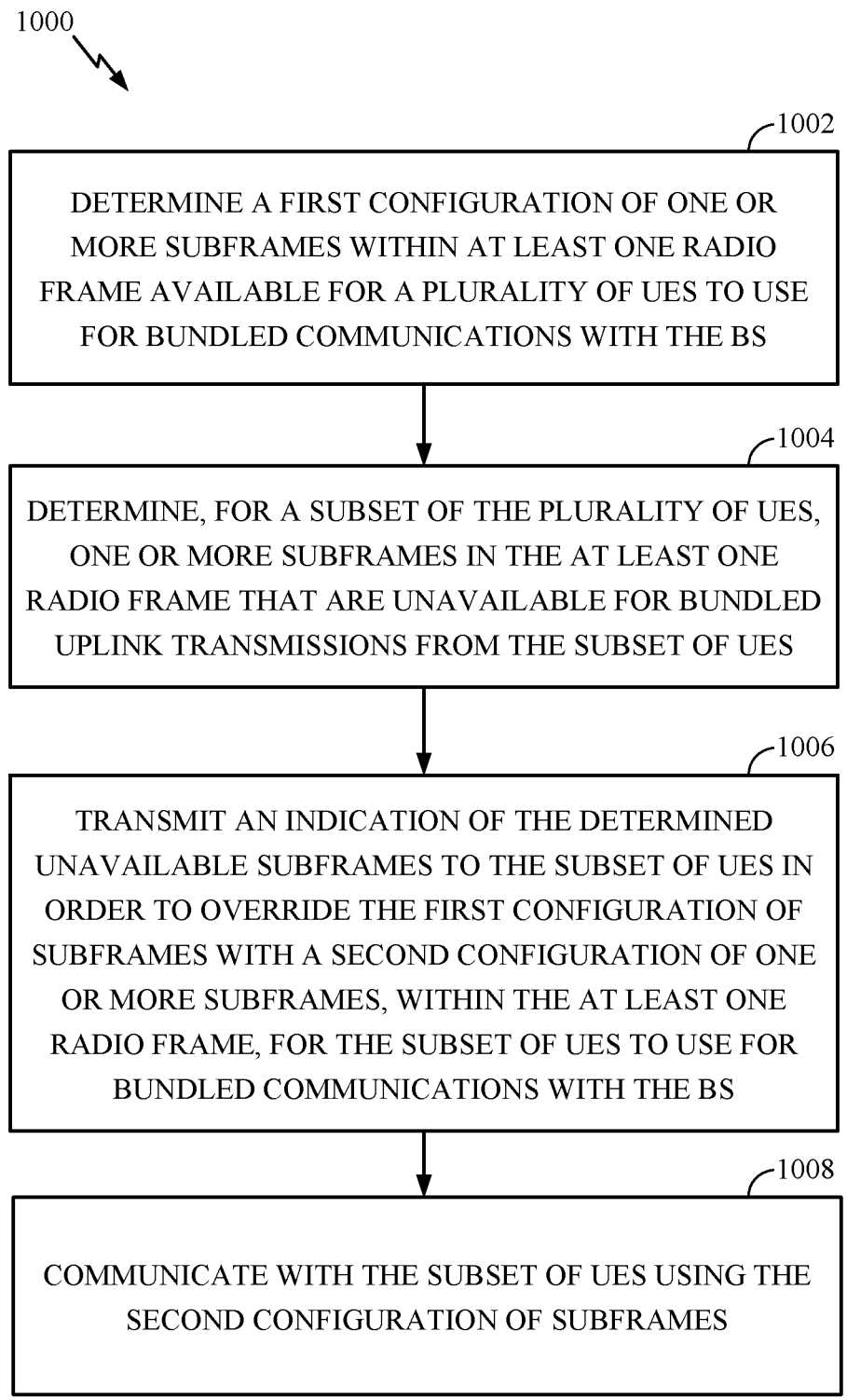
FIG. 10 is a flow diagram illustrating example operations for wireless communications by a base station (BS), in accordance with certain aspects of the present disclosure.
Figure 13:
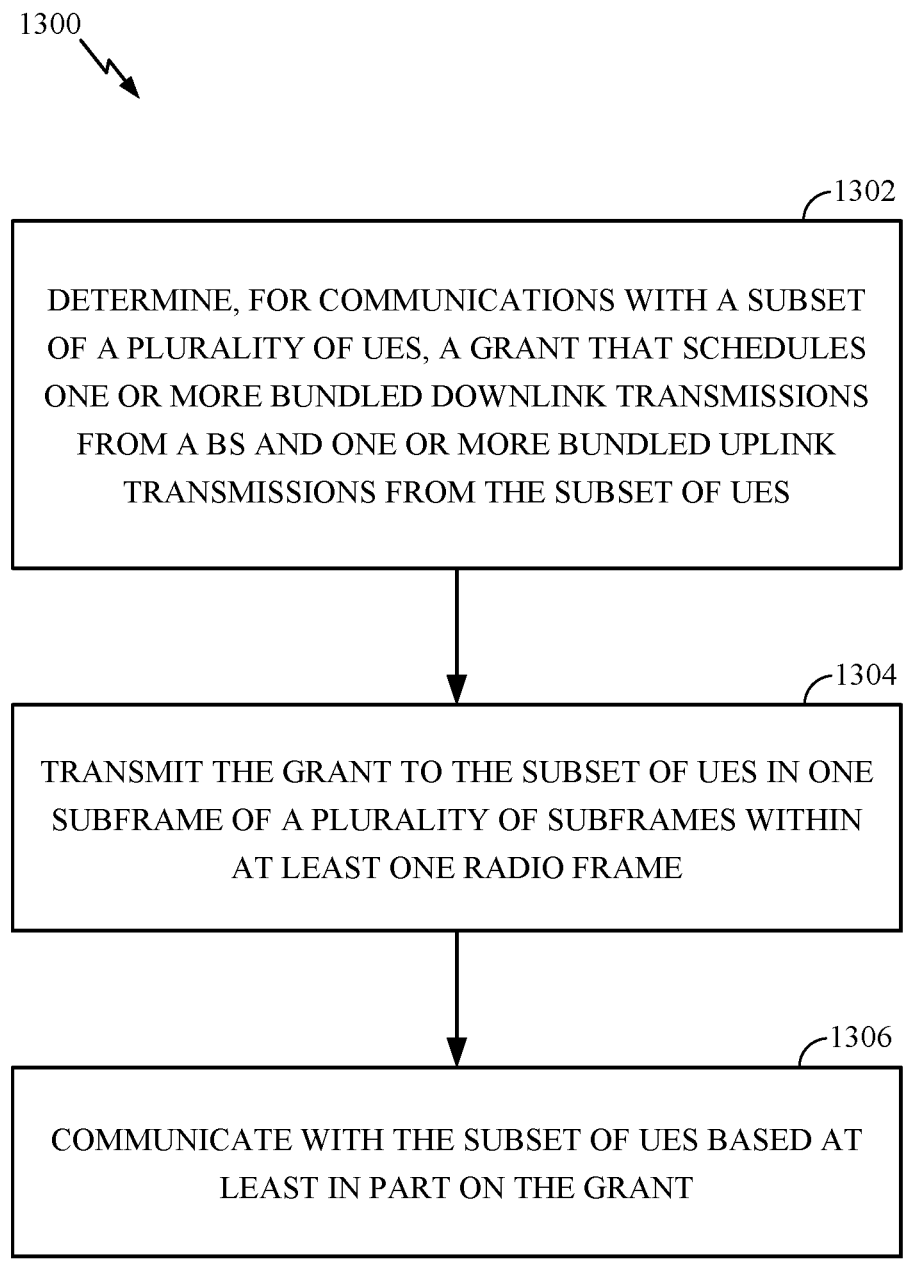
FIG. 13 is a flow diagram illustrating example operations for wireless communications by a BS, in accordance with certain aspects of the present disclosure.
Figure 16:
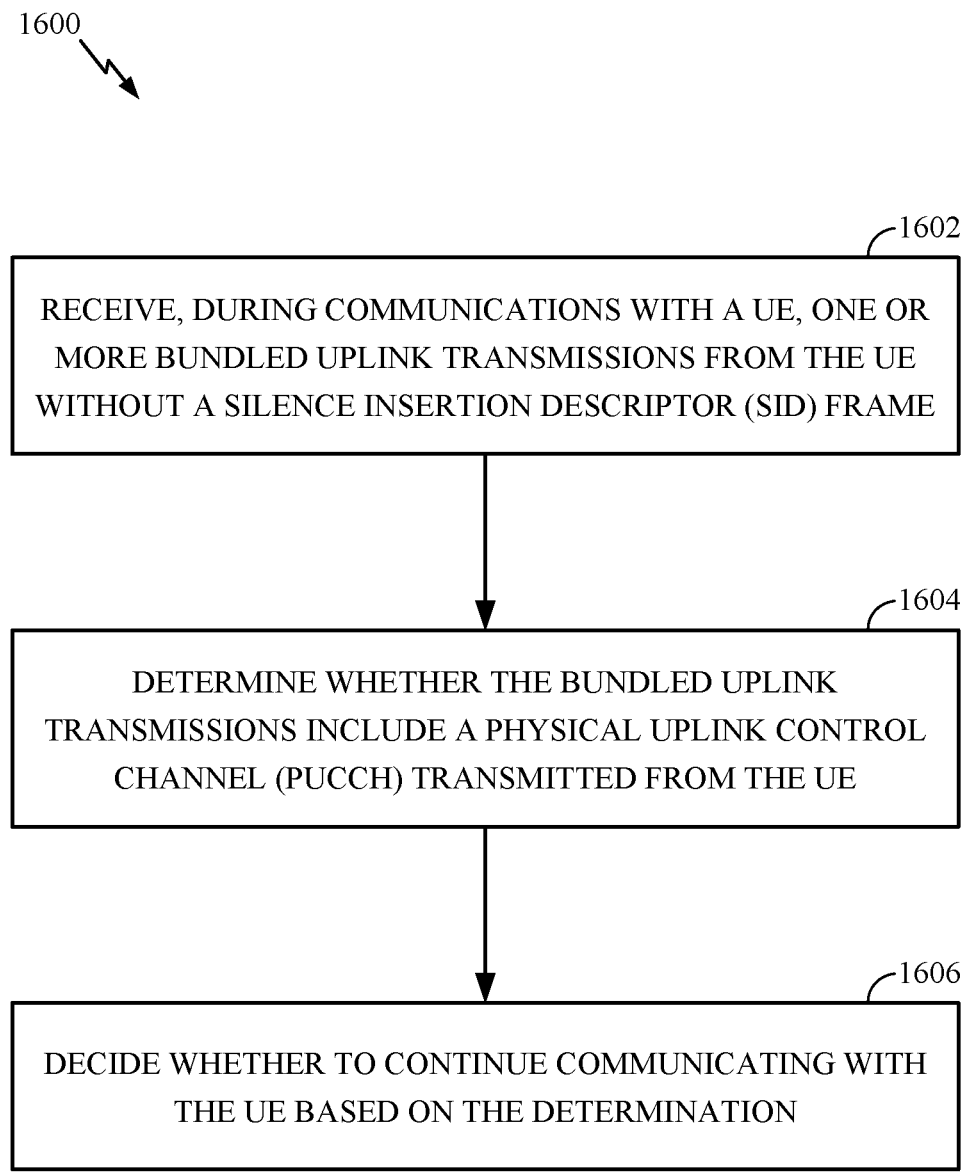
FIG. 16 is a flow diagram illustrating example operations for wireless communications by a BS, in accordance with certain aspects of the present disclosure.

In certain aspects, the controller/processor 675 and/or other processors, components and/or modules at the eNB 610 may perform or direct operations, for example, operations 1000 in FIG. 10, operations 1300 in FIG. 13, operations 1600 in FIG. 16, and/or other processes for the techniques described herein for optimizing VoLTE operations. In certain aspects, one or more of any of the components shown in FIG. 6 may be employed to perform example operations 1000, operations 1300, operations 1600 and/or other processes for the techniques described herein. The memories 660 and 676 may store data and program codes for the UE 650 and eNB 610 respectively, accessible and executable by one or more other components of the UE 650 and the eNB 610.

As mentioned above, one or more UEs in the wireless communication network (e.g., network 100) may be devices that have limited communication resources, such as LC UEs, as compared to other (non-LC) devices in the wireless communication network.

In some systems, for example, in LTE Rel-13, the LC UE may be limited to a particular narrowband assignment (e.g., of no more than six resource blocks (RBs)) within the available system bandwidth. However, the LC UE may be able to re-tune (e.g., operate and/or camp) to different narrowband regions within the available system bandwidth of the LTE system, for example, in order to co-exist within the LTE system.

As another example of coexistence within the LTE system, LC UEs may be able to receive (with repetition) legacy physical broadcast channel (PBCH) (e.g., the LTE physical channel that, in general, carries parameters that may be used for initial access to the cell) and support one or more legacy physical random access channel (PRACH) formats. For example, the LC UE may be able to receive the legacy PBCH with one or more additional repetitions of the PBCH across multiple subframes. As another example, the LC UE may be able to transmit one or more repetitions of PRACH (e.g., with one or more PRACH formats supported) to an eNB in the LTE system. The PRACH may be used to identify the LC UE. Also, the number of repeated PRACH attempts may be configured by the eNB.

The LC UE may also be a link budget limited device and may operate in different modes of operation (e.g. entailing different amounts of repeated messages transmitted to or from the LC UE) based on its link budget limitation. For example, in some cases, the LC UE may operate in a normal coverage mode in which there is little to no repetition (e.g., the amount of repetition needed for the UE to successfully receive and/or transmit a message may be low or repetition may not even be needed). Alternatively, in some cases, the LC UE may operate in a coverage enhancement (CE) mode in which there may be high amounts of repetition. For example, for a 328 bit payload, a LC UE in CE mode may need 150 or more repetitions of the payload in order to successfully receive the payload.

In some cases, e.g., also for LTE Rel-13, the LC UE may have limited capabilities with respect to its reception of broadcast and unicast transmissions. For example, the maximum transport block (TB) size for a broadcast transmission received by the LC UE may be limited to 1000 bits. Additionally, in some cases, the LC UE may not be able to receive more than one unicast TB in a subframe. In some cases (e.g., for both the CE mode and normal mode described above), the LC UE may not be able to receive more than one broadcast TB in a subframe. Further, in some cases, the LC UE may not be able to receive both a unicast TB and a broadcast TB in a subframe.

For MTC, LC UEs that co-exist in the LTE system may also support new messages for certain procedures, such as paging, random access procedure, etc. (e.g., as opposed to conventional messages used in LTE for these procedures). In other words, these new messages for paging, random access procedure, etc. may be separate from the messages used for similar procedures associated with non-LC UEs. For example, as compared to conventional paging messages used in LTE, LC UEs may be able to monitor and/or receive paging messages that non-LC UEs may not be able to monitor and/or receive. Similarly, as compared to conventional random access response (RAR) messages used in a conventional random access procedure, LC UEs may be able to receive RAR messages that also may not be able to be received by non-LC UEs. The new paging and RAR messages associated with LC UEs may also be repeated one or more times (e.g., "bundled"). In addition, different numbers of repetitions (e.g., different bundling sizes) for the new messages may be supported.

Figure 7A:
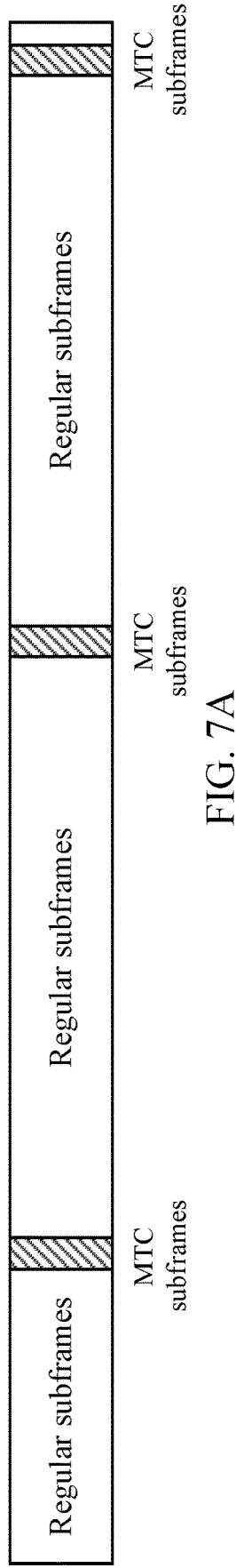
FIGS. 7A and 7B illustrate an example of MTC coexistence within a wideband system, such as LTE, in accordance with certain aspects of the present disclosure.
Figure 7B:
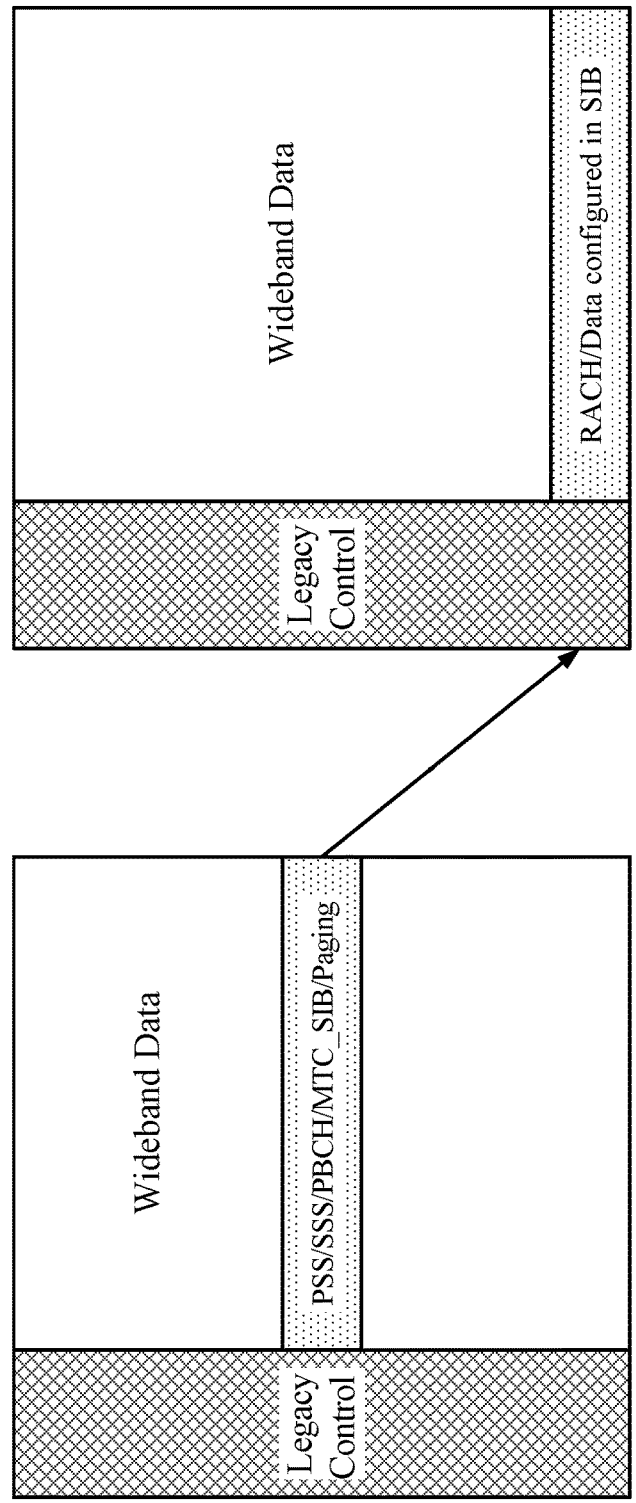

As mentioned above, MTC and/or eMTC operation may be supported in the wireless communication network (e.g., in coexistence with LTE or some other RAT). FIGS. 7A and 7B, for example, illustrate an example of how LC UEs in MTC operation may co-exist within a wideband system, such as LTE.

As illustrated in the example frame structure of FIG. 7A, subframes associated with MTC and/or eMTC operation may be time division multiplexed (TDM) with regular subframes associated with LTE (or some other RAT).

Additionally or alternatively, as illustrated in the example frame structure of FIG. 7B, one or more narrowband regions used by LC UEs in MTC may be frequency division multiplexed within the wider bandwidth supported by LTE. Multiple narrowband regions, with each narrowband region spanning a bandwidth that is no greater than a total of 6 RBs, may be supported for MTC and/or eMTC operation. In some cases, each LC UE in MTC operation may operate within one narrowband region (e.g., at 1.4 MHz or 6 RBs) at a time. However, LC UEs in MTC operation, at any given time, may re-tune to other narrowband regions in the wider system bandwidth. In some examples, multiple LC UEs may be served by the same narrowband region. In other examples, multiple LC UEs may be served by different narrowband regions (e.g., with each narrowband region spanning 6 RBs). In yet other examples, different combinations of LC UEs may be served by one or more same narrowband regions and/or one or more different narrowband regions.

The LC UEs may operate (e.g., monitor/receive/transmit) within the narrowband regions for various different operations. For example, as shown in FIG. 7B, a first narrowband region (e.g., spanning no more than 6 RBs of the wideband data) of a subframe may be monitored by one or more LC UEs for either a PSS, SSS, PBCH, MTC signaling, or paging transmission from a BS in the wireless communication network. As also shown in FIG. 7B, a second narrowband region (e.g., also spanning no more than 6 RBs of the wideband data) of a subframe may be used by LC UEs to transmit a RACH or data previously configured in signaling received from a BS. In some cases, the second narrowband region may be utilized by the same LC UEs that utilized the first narrowband region (e.g., the LC UEs may have re-tuned to the second narrowband region to transmit after monitoring in the first narrowband region). In some cases (although not shown), the second narrowband region may be utilized by different LC UEs than the LC UEs that utilized the first narrowband region.

Although the examples described herein assume a narrowband of 6 RBs, those skilled in the art will recognize that the techniques presented herein may also be applied to different sizes of narrowband regions.

Figure 8A:
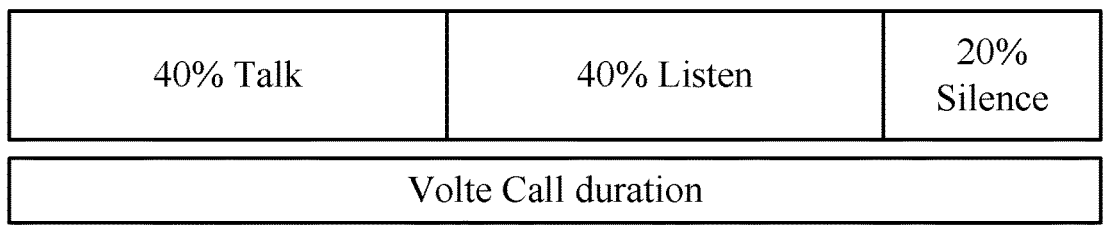
FIG. 8A illustrates an example of different states for a VoLTE call, in accordance with certain aspects of the present disclosure.
Figure 8B:
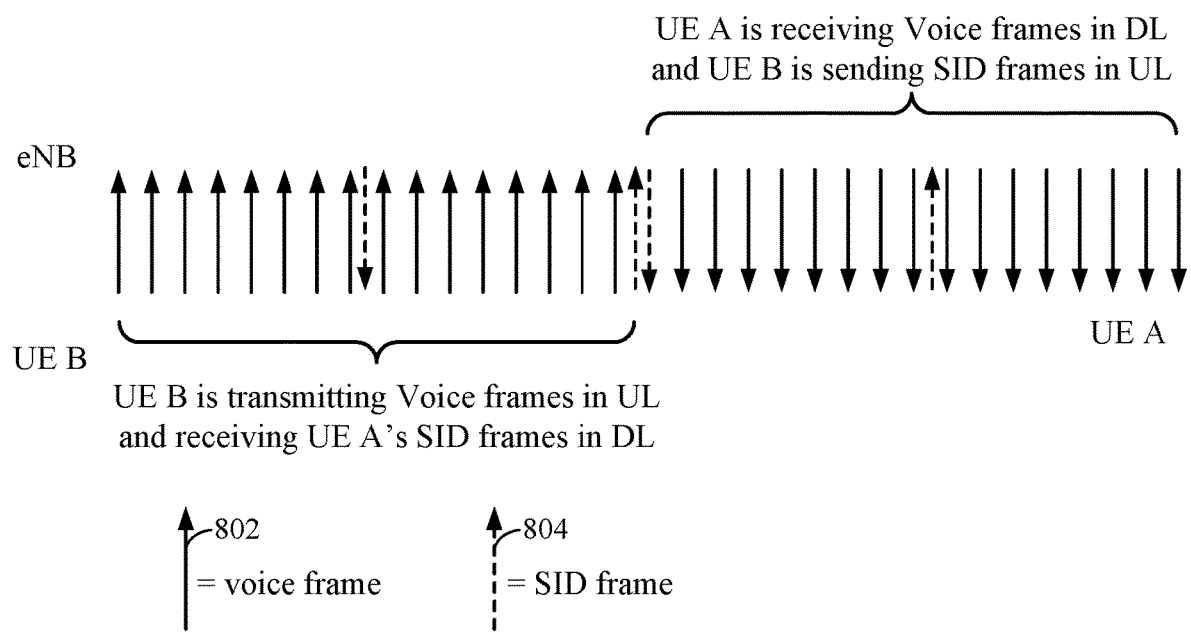
FIG. 8B illustrates an example exchange of voice and silence frames for a VoLTE call, in accordance with certain aspects of the present disclosure.

Certain networks, for example, such as long term evolution (LTE), may be Internet Protocol (IP)-based network that are packet-switched. Circuit-switched (CS) connections may not be supported in such networks. It may be desirable for voice calls and data to be carried on the same LTE network. Voice over LTE (VoLTE) is a service for carrying voice and data on LTE. In general, VoLTE employs a two state model, one state for talking and one state for listening. As shown in FIG. 8A, for example, 40% of a VoLTE call duration may be for talking, 40% of the VoLTE call duration may be for listening, and 20% of the call duration may be silent. Generally, during the talking state, a voice over IP (VoIP) packet is generated every 20 milliseconds (ms). The size of the packet may depend on the voice encoder (vocoder) that is used by the transmitting device. For example, for devices that use the adaptive multi-rate (AMR) audio codec to encode at 12.2 kbit/s, the size of the packet may be 31 bytes. During the listening state, the UE may generate a silence insertion descriptor (SID) packet every 160 ms. FIG. 8B illustrates an example of voice frames and SID frames. The SID packet may be transmitted in order to keep the connection (e.g., for a VoLTE call) alive. That is, the SID packet informs the device receiving the silence frame that the transmitting device is still active and transmitting during the call. Alternatively, or additionally, the SID packet may serve to generate a desired amount of background noise for the call.

FIG. 8B shows one example exchange of voice frames and SID frames during a VoLTE call, according to certain aspects of the present disclosure. In this example, while UE B is in the talking state, UE B transmits voice frames 802 (e.g., in the uplink direction) to UE A (e.g., via eNB) every 20 msec. Additionally, while in the talking state, UE B receives a SID packet 804 transmitted from UE A (e.g., via the eNB). Once UE B transitions to the listening state, UE B receives UE A's voice frames 802 (e.g., via the eNB) every 20 ms, and transmits a SID frame 804 to UE A (e.g., via the eNB) every 160 ms.

Figure 9:
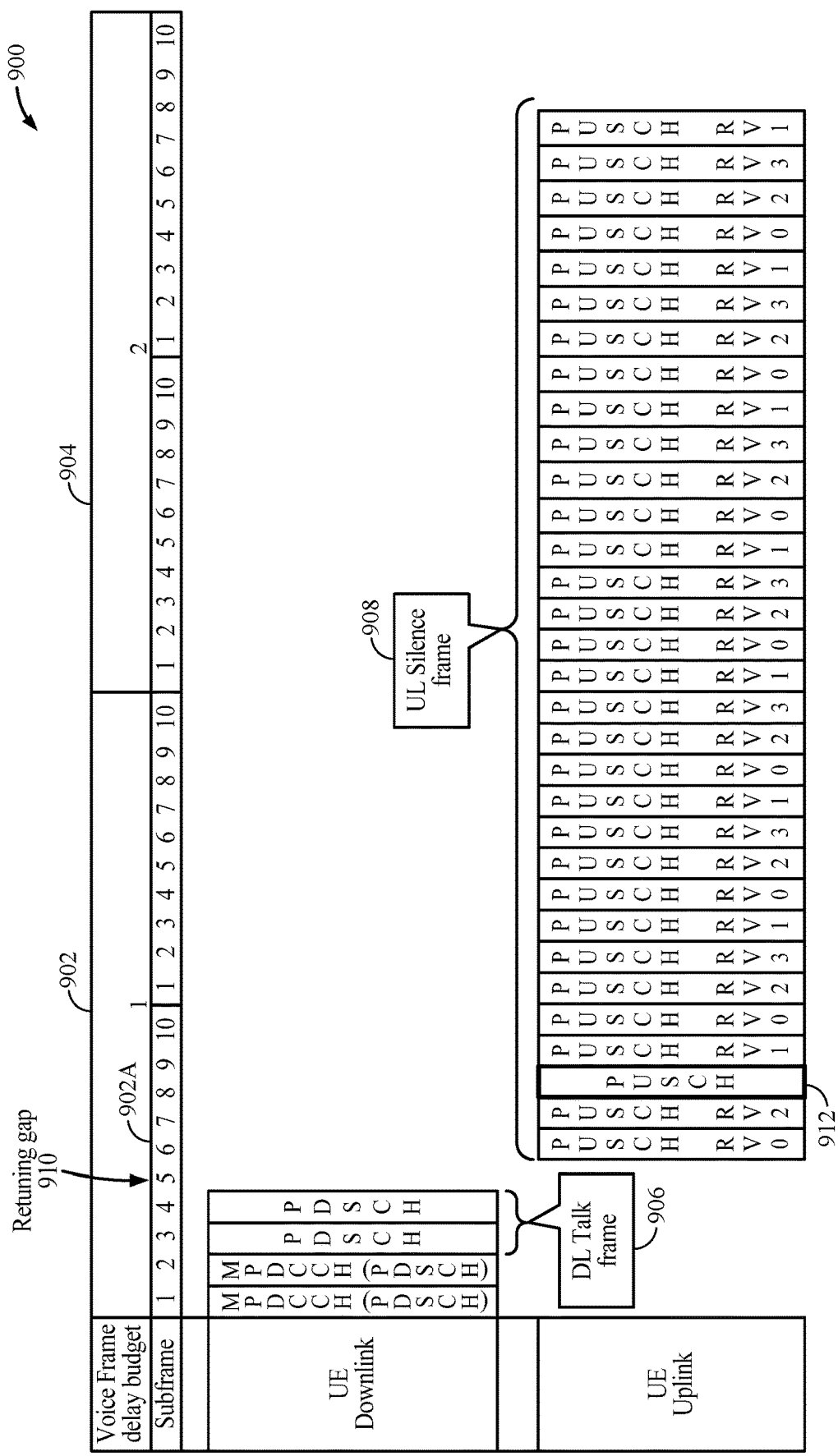
FIG. 9 illustrates an example timeline for a UE for a portion of a VoLTE call, in accordance with certain aspects of the present disclosure.

FIG. 9 illustrates an example talk+SID timeline 900 for an eMTC device for a portion of a VoLTE call, in accordance with certain aspects of the present disclosure. Timeline 900 includes a MAC bundling of two voice frames 902, 904 (e.g., a duration of 40 ms) with DL talk frame 906 and UL Silence frame 908. DL talk frame 906 includes two downlink repetitions, and UL silence frame 902 includes 32 uplink repetitions.

In systems that support real time services, e.g., such as VoLTE, such services may have a strict latency budget in order to ensure a minimum level of voice quality for the VoIP call. However, as mentioned above, certain LC UEs (e.g., eMTC devices) may be link budget limited devices operating with limited communication resources (compared to other non-LC UEs in the network) that may make it difficult for such devices to meet the strict latency budget for VoLTE operation. For example, in the downlink direction, an eMTC device may be limited to 6 RBs. In some cases, the downlink limitation can be improved by power boosting at the eNB (e.g., ~5 dB). For example, if PDSCH needs 20 resource blocks, the same (or similar) link budget can be met by transmitting in 6 RBs, and power boosting approximately 5.2 dB.

Still further, additional enhancements made in LTE Release 13 to support MTC operations may make it difficult for eMTC devices to meet the strict latency budget for VoLTE operation. For example, eMTC devices typically employ half-duplex type B operation, which introduces retuning gaps between uplink and downlink directions. Thus, a UE that employs this type of half-duplex operation may take one or more subframes to retune (or transition) from uplink to downlink and vice versa. FIG. 9, for example, illustrates a single subframe (e.g., subframe 5) retuning gap 910 from downlink to uplink. In this example, after the UE receives a physical downlink shared channel (PDSCH) in subframe 4 of the first radio frame 902A, the UE is not able to transmit physical uplink shared channel (PUSCH) until subframe 6 of the first radio frame 902A.

As another example, eMTC devices generally support cross-subframe scheduling in the downlink. For example, a MTC physical downlink control channel (MPDCCH) received in subframe M may schedule PDSCH N subframes after subframe M (e.g., in subframe M+N). As shown in FIG. 9, for example, the MPDCCH received in subframe 1 of radio frame 902A schedules PDSCH in subframe 3 of radio frame 902A (e.g., where N=2). Such scheduling limitation can increase the control overhead, which limits the number of subframes that could have been used to receive data. For example, as shown in FIG. 9, the UE waits two subframes (where it cannot receive) in order to receive a single subframe. Additionally, there may be limited capacity of MPDCCH due to narrowband operation. For example, if the UE is monitoring for PDSCH in the entire narrowband (e.g., 6 RBs), it may not be able to also monitor for MPDCCH. Other examples of enhancements to eMTC that may affect VoLTE operation for eMTC devices include reduced bandwidth, one receive (RX) antenna, non-support for slot-level hopping or distributed transmission (that would allow for frequency diversity), etc.

In general, in order to achieve the strict link budget for VoLTE operation, eMTC devices (or category M1 UEs) may have to support a repetition level (or bundling amount) of four in the downlink direction and a repetition level of thirty-two in the uplink direction (e.g., in order to achieve a similar maximum coupling loss (MCL) as a category 1 UE). However, due in part to cross subframe scheduling, it can be difficult for eMTC devices to satisfy the link budget for VoLTE operation. As shown in FIG. 9, for example, the timeline 900 supports a bundling size of two for PDSCH as opposed to a bundling size of four. Note, however, that the above repetition levels for downlink and uplink directions assumes a bundling of two voice frames (e.g., a transmission every 40 ms). Those of ordinary skill in the art will recognize that other repetition levels may be appropriate for other amounts of bundling of voice frames.

Aspects presented herein provide techniques for optimizing VoLTE operation for eMTC devices. Specifically, techniques presented herein may allow eMTC devices to more efficiently satisfy the link budget associated with VoLTE operation.

According to certain aspects, the BS may provide additional scheduling flexibility by setting some uplink subframes as invalid. In general, the BS can set a cell specific configuration of valid/invalid subframes for all UEs in the network. However, doing so may not be ideal in terms of the network resource utilization. Techniques, therefore, allow the BS and certain UEs (e.g., eMTC devices) to override the cell-specific configuration with a UE-specific configuration. Doing so may increase the bundling size of the PDSCH, which in turn may give certain UEs more flexibility to meet the link budget for VoLTE.

FIG. 10 is a flow diagram illustrating example operations 1000 for wireless communications, in accordance with certain aspects of the present disclosure. The operations 1000 may be performed, for example, by a BS (e.g., eNB 106, 610). The operations 1000 may begin, at 1002, where the BS determines a first configuration of one or more subframes within at least one radio frame available for a plurality of UEs to use for bundled communications with the BS. At 1004, the BS determines, for a subset of the plurality of UEs, one or more subframes in the at least one radio frame that are unavailable for bundled uplink transmissions from the subset of UEs.

At 1006, the BS transmits an indication of the determined unavailable subframes to the subset of UEs in order to override the first configuration of subframes with a second configuration of one or more subframes, within the at least one radio frame, for the subset of UEs to use for bundled communications with the BS. At 1008, the BS communicates with the subset of UEs using the second configuration of subframes. In one aspect, the communication with the subset of UEs may include participating in a real time service (e.g., VoLTE call) with the subset of UEs using the second configuration of subframes. For example, the traffic received by the BS as part of the communication may include VoIP traffic.

FIG. 11 is a flow diagram illustrating example operations 1100 for wireless communications, in accordance with certain aspects of the present disclosure. The operations 1100 may be performed, for example, by a UE (e.g., UE 102, 650, such as an MTC/eMTC UE or NB-IoT UE). The operations 1100 may begin, at 1102, where the UE determines a first configuration of one or more subframes within at least one radio frame available for the UE and one or more other UEs to use for bundled communications with a BS. At 1104, the UE receives an indication of one or more subframes within the at least one radio frame that are unavailable for bundled uplink transmissions by the UE.

At 1106, the UE determines a second configuration of one or more subframes, within the at least one radio frame, for the UE to use for bundled communications with the BS based at least in part on the received indication. At 1108, the BS overrides the first configuration of subframes with the second configuration of one or more subframes. At 1110, the UE communicates with the BS using the determined second configuration of subframes. In one aspect, the communication with the BS may include participating in a real time service with the BS.

In one aspect, the real time service may include a voice call that uses VoIP. In some cases, the voice call may have a strict latency budget to provide good voice quality. The BS and/or UE may evaluate the quality of the voice call using one or more key performance indicators (KPIs) to determine if the quality of the voice call is above a certain threshold (e.g., determine whether the strict latency budget is met). Some examples of KPIs associated with the voice call include latency, jitter, packet loss, etc. The quality of the voice call may be inversely proportional to the latency and jitter.

Alternatively, in one aspect, the BS and/or UE may be configured to use the determined second configuration of subframes (e.g., for communication) based on determining that one or more performance indicators associated with the voice call may not be met based on the first configuration of subframes. Such determination can be based on predetermined metrics that indicate whether the performance indicators associated with the voice call can be met based on the first configuration of subframes. In one aspect, the BS and/or UE may determine the real time service to participate in based on identification from at least one of a quality of service (QoS) class identifier (QCI), an access point name (APN), Internet protocol (IP) address, differentiated services code point (DSCP) value, deep packet inspection, a static configuration for services or out of band signaling. Alternatively, in some cases, the eNB may already be participating in a VoIP call with a UE and may not determine the real time service to participate using one of the above. Put differently, the eNB in some cases may bypass the above step. The out of band signaling may be representative of the signaling between the LTE core and radio network components and the IMS components or between LTE core network components and the eNB.

In one aspect, the first configuration of subframes may be a cell-specific configuration for all UEs in the network and may indicate the valid/invalid subframes for the cell. In one aspect, the BS may identify a subset of UEs within the network and allow the identified subset of UEs to override the first subframe configuration with a second configuration of subframes (determined based on the indicated invalid subframes for bundled uplink transmissions). In one aspect, the BS may determine the UEs in the subset based on the type (or capability) of the UEs. For example, the UEs in the subset may be Rel-14 UEs, and the other UEs may be Rel-13 UEs (or support another release). In one example, the type may correspond to bandwidth restricted UEs operating in a CE mode or power limited mode. In one example, the BS may determine whether the UEs are bandwidth restricted and operating in CE mode (or power limited mode) based on one or more of a UE capability report, CQI, measurement report from the UEs or a configured UE identifier. In some cases, the BS may transmit the UE-specific parameter that indicates the overriding valid/invalid subframe configuration (e.g., to the determined UEs in the subset) via RRC configuration.

In one aspect, the BS may communicate (e.g., participate in a real-time service) with the subset of UEs by transmitting one or more bundled downlink transmissions to the subset of UEs across multiple subframes. In one example, the multiple subframes in the radio frame (associated with the bundled downlink transmissions) may include at least one of the indicated unavailable subframes. The bundled downlink transmissions may include repetitions of PDSCH.

According to certain aspects, the BS may introduce a delay bit (in a grant) to allow the subset of UEs to postpone (or delay) the start of bundled uplink transmissions to the BS. That is, the BS may determine an amount of time for the subset of UEs to delay a start of bundled uplink transmissions to the BS using the second configuration of subframes, and may transmit an indication of the determined delay time to the subset of UEs. In one aspect, the BS may transmit the delay within a grant of the bundled downlink transmissions to the UE. The BS can configure certain types of UEs (e.g., Rel 14 UEs) to monitor for the UL and/or DL grants with the additional delay field.

Once the one or more UEs in the subset receive the indication of the subframes that are unavailable for bundled uplink transmissions, the subset of UEs may override the first configuration with a second configuration determined based on the indication. In some cases, the UEs may monitor for one or more bundled downlink transmissions from the BS across multiple subframes including the at least one of the indicated unavailable subframes. In one aspect, upon receiving the delay parameter, the UEs may determine a subframe in the at least one radio frame to start a bundled uplink transmission based on the indicated amount of time to delay. The UEs may postpone the start of one or more bundled uplink transmissions scheduled to occur in one of the indicated unavailable subframes until the determined subframe. The bundled uplink transmissions may include one or more repetitions of PUSCH.

Figure 12:
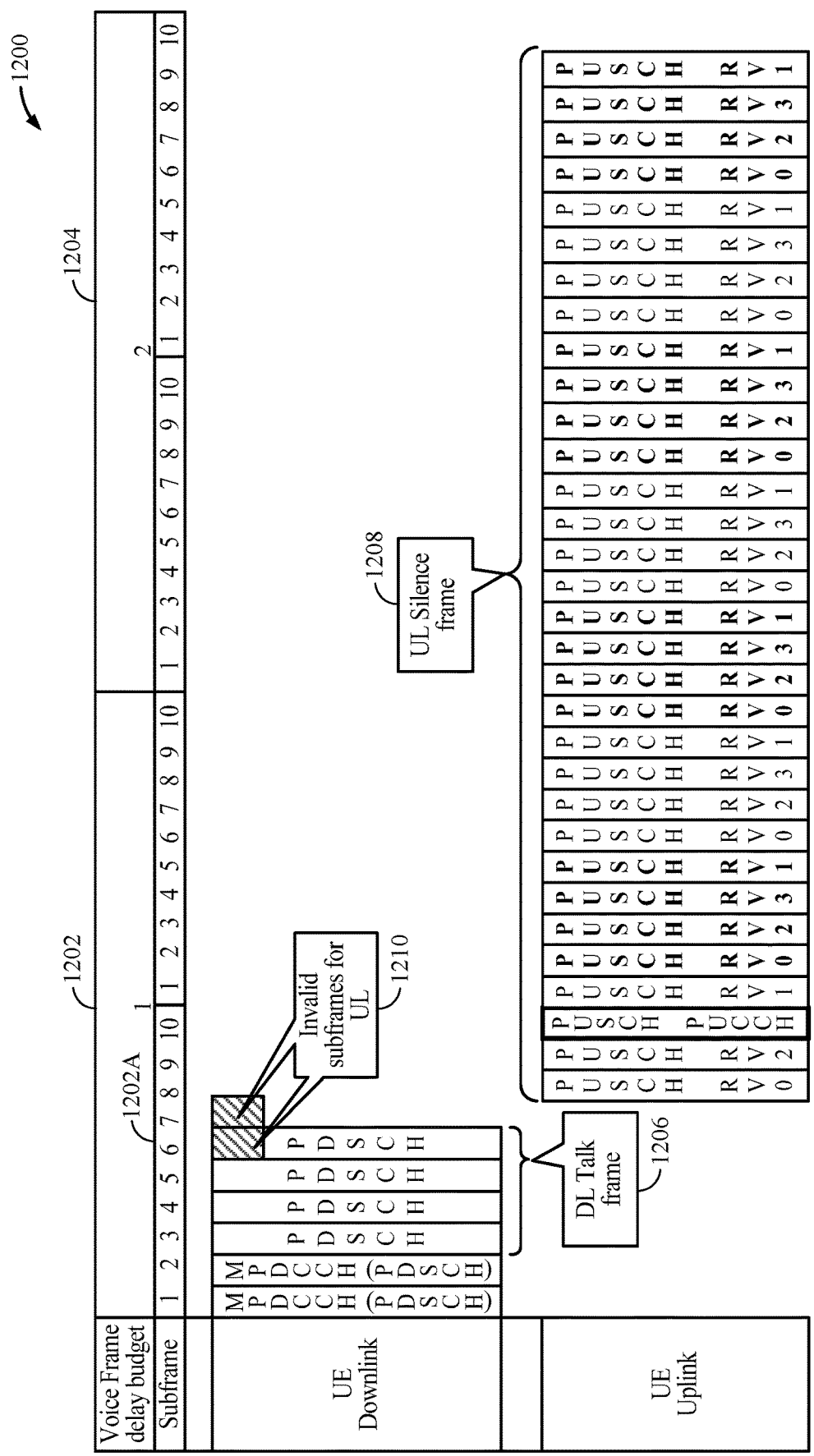
FIG. 12 illustrates an example of a UE overriding a cell-specific subframe configuration with a UE-specific subframe configuration, in accordance with certain aspects of the present disclosure.

FIG. 12 shows one example of certain UEs (e.g., Rel 14 UEs) overriding a cell-specific subframe configuration with a UE-specific subframe configuration in order to postpone PUSCH transmissions and allow for more repetitions for the PDSCH, in accordance with certain aspects of the present disclosure. The talk+SID timeline 1200 in FIG. 12 includes a MAC bundling of two voice frames 1202, 1204 (e.g., a duration of 40 ms) with DL talk frame 1206 and UL Silence frame 1208.

As shown, the UE (e.g., Rel 14 UE) receives an indication that subframes 6 and 7 of radio frame 1202A are invalid subframes 1210 for UL. In response, the UE postpones the start of the bundled UL silence frame (e.g., to subframe 8 of radio frame 1202A) and uses at least one of the invalid subframes 1210 (subframe 6 of radio frame 1202A in this example) to monitor for additional PDSCH transmissions from the BS. In this manner, the repetition level for PDSCH can be increased to four to satisfy the link budget for VoLTE operation. For example, the DL talk frame 1206 includes four repetitions of PDSCH compared to DL talk frame 906, which includes two repetitions of PDSCH.

According to certain aspects, techniques presented herein can increase scheduling flexibility by allowing devices to use a new "joint grant" that schedules both PDSCH and PUSCH at the same time. For example, certain UEs can be configured in a "joint grant" mode and monitor for a grant that contains assignments for both DL and UL shared channels.

FIG. 13 is a flow diagram illustrating example operations 1300 for wireless communications, in accordance with certain aspects of the present disclosure. The operations 1300 may be performed, for example, by a BS (e.g., eNB 106, 610). The operations 1300 may begin, at 1302, where the BS determines, for communications with a subset of a plurality of UEs, a grant that schedules one or more bundled downlink transmissions from the BS and one or more bundled uplink transmissions from the subset of UEs. At 1304, the BS transmits the grant to the subset of UEs in one subframe of a plurality of subframes within at least one radio frame. At 1306, the BS communicates with the subset of UEs based at least in part on the grant. In one aspect, the communication with the subset of UEs may include participating in a real time service with the subset of UEs. The real time service may include a voice call using VoIP.

FIG. 14 is a flow diagram illustrating example operations 1400 for wireless communications, in accordance with certain aspects of the present disclosure. The operations 1400 may be performed, for example, by a UE (e.g., UE 102, 650, such as an eMTC device or NB-IoT device). The operations 1400 may begin, at 1402, where the UE receives, for communications with a BS, in one subframe of a plurality of subframes within at least one radio frame, a grant for bundled downlink transmissions from the BS and bundled uplink transmissions from the UE. At 1404, the UE communicates with the BS based on the received grant. The communication with the BS may include participating in a real time service (e.g., a voice call using VoIP) with the BS.

According to certain aspects, the BS may configure certain types of UEs to monitor for the "joint grant" (e.g., "6-01" grant) that includes a downlink scheduling assignment (e.g., "6-1" format) and an uplink scheduling grant (e.g., "6-0" format). In one aspect, the "joint grant" mode may be configured for devices that support a particular CE mode (e.g., CE mode A). The BS may configure the particular UEs to the "joint grant" mode via RRC signaling.

In one aspect, the BS may configure two sets of grant parameters via RRC signaling. In a first configuration, the BS may configure the UE for an initial DL voice state and subsequent UL silence state. In a second configuration, the BS may configure the UE for an initial UL voice state and subsequent DL silence state. There may be a field in the "joint grant" that indicates to the UE which configuration should be used for the next transmission. The UE may transmit PUSCH a number of subframes after the end of the PDSCH assignment. In one aspect, the UE may transmit PUSCH two subframes after the end of the PDSCH assignment.

Once the UE is connected, the UE may monitor for the "joint grant." In one aspect, the UE may determine the bundle size for PUSCH and/or PDSCH implicitly or explicitly from the RRC configuration or "joint grant." In one aspect, the "joint grant" may be aligned with the size of the uplink scheduling grant (e.g., "6-0") so as to not increase the number of blind decodings. The "joint grant" may include information for at least one of a resource allocation for a PUSCH, transport block (TB) size for the PUSCH, or bundling size for the PUSCH. Additionally, the "joint grant" may include information for at least one of a resource allocation for a PDSCH, TB size for the PDSCH, or bundling size for the PDSCH. The "joint grant" may include one or two fields for the resource allocation (e.g., to indicate the narrowband and/or number of RBs). Further, the set of repetitions may be different from previous sets. For example, in some cases, six repetitions (e.g., as opposed to four repetitions) may be supported in order to obtain an additional gain for the downlink.

Figure 15:
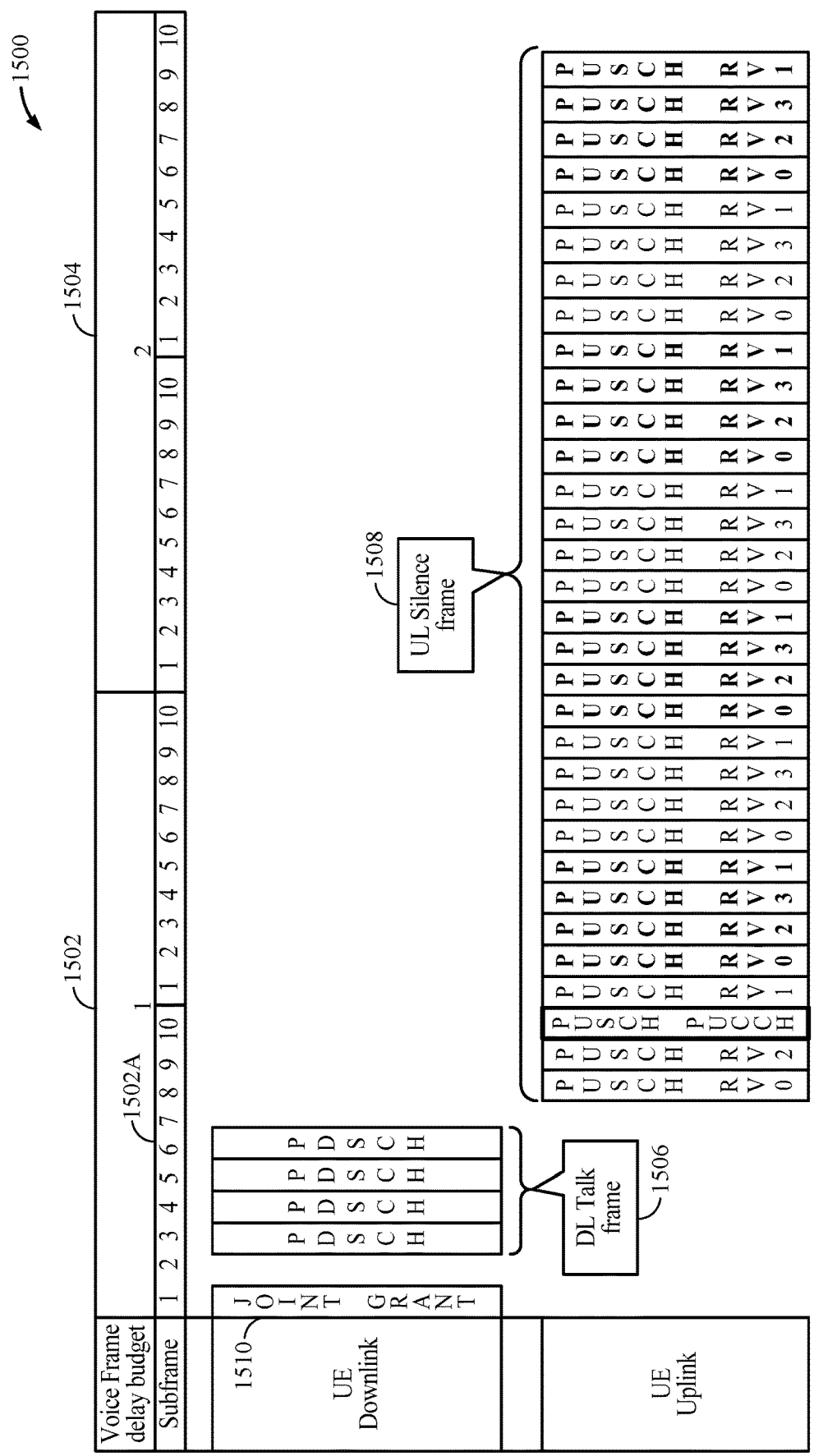
FIG. 15 illustrates an example of a "joint grant" that schedules PDSCH and PUSCH at the same time, in accordance with certain aspects of the present disclosure.

FIG. 15 shows one example of certain UEs (e.g., Rel 14 UEs) monitoring for a joint grant that contains PDSCH and PUSCH assignments, in accordance with certain aspects of the present disclosure. The talk+SID timeline 1500 in FIG. 15 includes a MAC bundling of two voice frames 1502, 1504 (e.g., a duration of 40 ms) with DL talk frame 1506 and UL Silence frame 1508. As shown, the UE (e.g., Rel 14 UE) receives a "joint grant" 1510 that schedules both PDSCH and PUSCH at the same time (e.g., in subframe 1 of radio frame 1502A). In this example, the repetition level for PDSCH can also be increased to four to satisfy the link budget for VoLTE operation. For example, as shown, DL talk frame 1506 includes four repetitions of PDSCH compared to DL talk frame 906, which includes two repetitions of PDSCH.

As mentioned above, SID frames in VoLTE are generally used as keep-alive frames (e.g., to indicate that the UE is still connected and has not lost coverage). However, in some cases, the BS can determine that the UE is still active based on detecting PUCCH (from the UE) transmitted in response to a PDSCH. For example, referring back to FIG. 9, in some cases, the UE may puncture one of the bundled PUSCH transmissions in order to transmit a PUCCH 912. In such a case, it may not be necessary for UEs to transmit SID frames. Accordingly, techniques presented herein can increase scheduling flexibility by allowing devices (e.g., UEs) to remove SID frames that are transmitted in the uplink direction and allowing devices (e.g., eNBs) to use the detection of PUCCH as an alternative mechanism for keeping the connection alive.

According to certain aspects, when the BS detects PUCCH in response to a PDSCH, the PHY layer of the BS can send a message to the L2 layer of the BS indicating that the connection is alive (e.g., PUCCH was received, regardless of ACK/NAK). Once received, the L2 layer of the BS can generate an SID frame and send (or forward) the SID frame to higher layers of the BS.

In one aspect, the HARQ engine of the eNB may also implement the above technique. For example, when the HARQ engine receives an ACK, it may flush the buffer and indicate to higher layers of the eNB that the ACK for PUCCH was received. The higher layers, in turn, can generate and insert the SID frame. Doing so in this manner can significantly increase the downlink link budget (e.g., since PDSCH for voice can be repeated more often, and SID frames do not have to be transmitted in the uplink).

FIG. 16 is a flow diagram illustrating example operations 1600 for wireless communications, in accordance with certain aspects of the present disclosure. The operations 1600 may be performed, for example, by a BS (e.g., eNB 106, 610). The operations 1600 may begin, at 1602, where the BS receives, during communications with a UE, one or more bundled uplink transmissions from the UE without a SID frame. At 1604, the BS determines whether the bundled uplink transmissions include a PUCCH transmitted from the UE. At 1606, the BS decides whether to continue communicating with the UE based on the determination. In one aspect, the communications with the UE may include participation in a voice call using VoIP.

According to one aspect, the BS may generate a SID frame for the communications (e.g., voice call) upon determining the bundled uplink transmissions include a PUCCH. The BS may then deliver (or forward) the SID frame to one or more higher layers of the BS (e.g., to mimic the reception of the SID frame). In one aspect, the BS may decide to continue communicating with the UE if the BS determines the bundled uplink transmissions do include a PUCCH. In one aspect, the BS may decide to discontinue communicating with the UE if the BS determines the bundled uplink transmissions do not include a PUCCH.

FIG. 17 is a flow diagram illustrating example operations 1700 for wireless communications, in accordance with certain aspects of the present disclosure. The operations 1700 may be performed, for example, by a UE (e.g., UE 102, 650, such as an eMTC device or NB-IoT device). The operations 1700 may begin, at 1702, where the UE transmits, during communications with a BS, one or more bundled uplink transmissions to the BS without a SID frame. At 1704, the UE transmits a PUCCH within the bundled uplink transmissions to indicate that the UE is connected to the BS via the communications. In one aspect, the communications with the BS may include a voice call using VoIP.

In some aspects, the UE may transmit a PUCCH within a first one or more bundled uplink transmission to indicate the UE is connected to the BS via the communications. In some aspects, the UE may transmit a second one or more bundled uplink transmissions without a PUCCH to indicate the UE is not connected to the BS via the communications. In some cases, the UE may be a bandwidth restricted UE operating in a CE mode or power limited mode.

Figure 18:
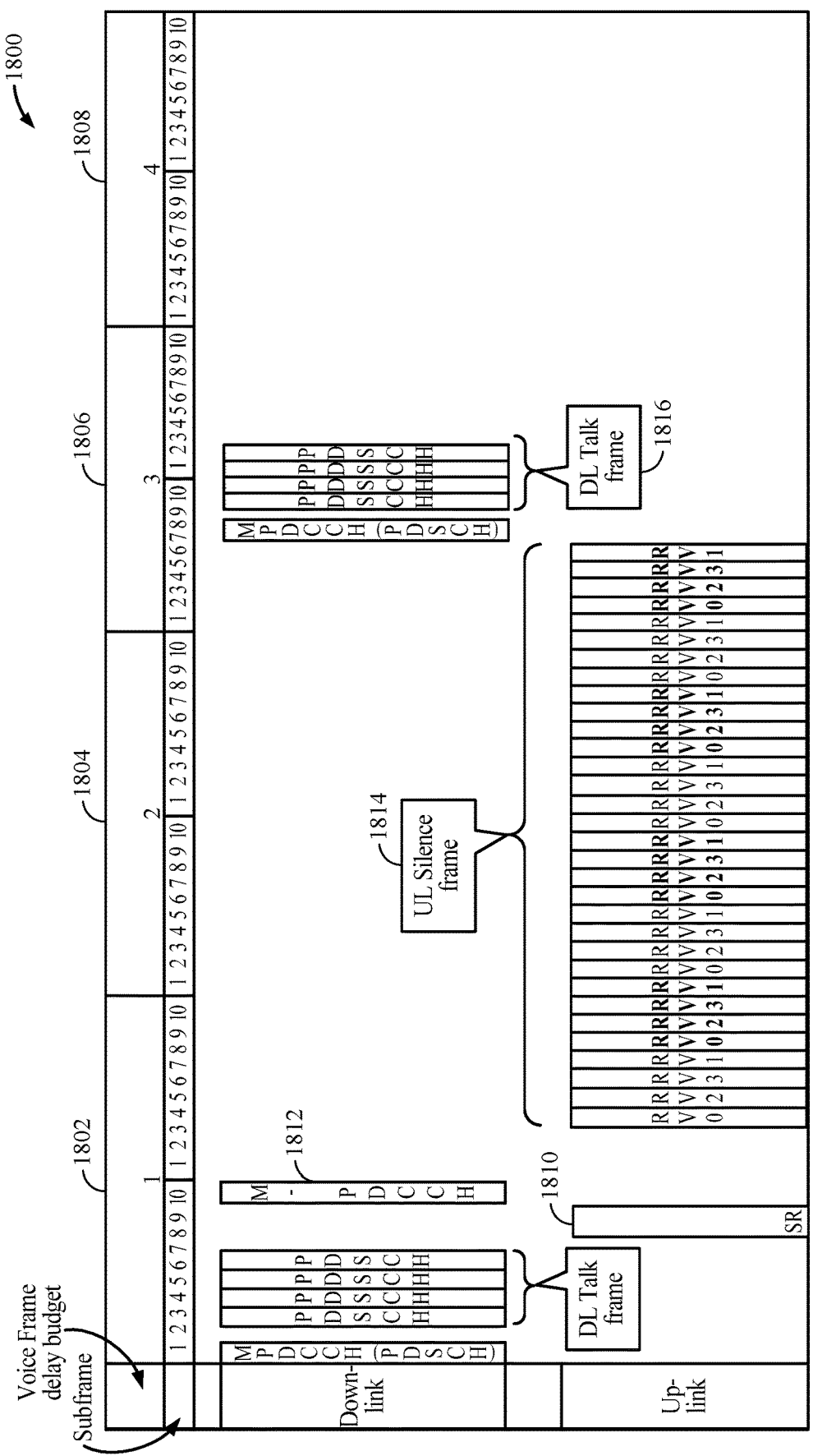
FIG. 18 illustrates an example of a delayed SID frame delivery for a VoLTE call, in accordance with certain aspects of the present disclosure.

FIG. 18 illustrates an example talk+SID timeline 1800 for an eMTC device for a portion of a VoLTE call, in accordance with certain aspects of the present disclosure. Timeline 1800 includes a MAC bundling of four voice frames 1802, 1804, 1806, 1808 (e.g., a duration of 80 ms). As shown in FIG. 18, in some aspects, the SID frame delivery may be delayed (e.g., up to 50 ms). Once the UE transmits a scheduling request (SR) message 1810, the UE may have to wait for the PUSCH assignment (in MPDCCH 1812) before it can begin transmitting the uplink silence frame 1814. As shown, however, doing so extends the UL silence frame delivery, which delays the next DL voice frame 1816. However, by using one or more of the techniques described above, aspects presented herein may allow subsequent frames to catch up to meet the deadlines associated with VoLTE.

The techniques described above VoLTE optimizations for eMTC devices may help such devices satisfy the strict latency budget for VoLTE operations.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for determining, means for deciding, means for participating, means for evaluating, means for monitoring, means for generating, means for delivering, means for indicating, means for adjusting, means for establishing, means for delaying, means for allowing, means for identifying, means for overriding, means for postponing, means for maintaining, means for communicating, means for transmitting, means for forwarding, means for giving up, and/or means for including, may comprise a processing system, which may include one or more processors, such as the TX processor 616, transmitter(s) 618, and/or the controller/processor 675 of the wireless base station 610 illustrated in FIG. 6, and/or the TX processor 668, the transmitter(s) 654, and/or the controller/processor 659 of the user equipment 650 illustrated in FIG. 6. Means for transmitting, means for delivering, means for communicating, means for forwarding, and/or means for sending may comprise a transmitter, which may include TX processor 616, transmitter(s) 618, and/or the antenna(s) 620 of the wireless base station 610 illustrated in FIG. 6, and/or the TX processor 668, the transmitter(s) 654, and/or the antenna(s) 652 of the user equipment 650 illustrated in FIG. 6. Means for receiving, means for forwarding, and/or means for communicating may comprise a receiver, which may include RX processor 670, receiver(s) 618, and/or the antenna(s) 620 of the wireless base station 610 illustrated in FIG. 6, and/or the RX processor 656, the receiver(s) 654, and/or the antenna(s) 652 of the user equipment 650 illustrated in FIG. 6. In aspects, such means for may include corresponding components of a network entity, such as an MME.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a wireless node (e.g., see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a wireless node and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or DVD, etc.), such that a wireless node and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving, for communications with a base station (BS), in one subframe of a plurality of subframes within at least one radio frame, a grant for bundled downlink transmissions from the BS and bundled uplink transmissions from the UE; and
   communicating with the BS based on the received grant, comprising transmitting a bundled physical uplink shared channel (PUSCH) across one or more subframes in the at least one radio frame based on the grant.

2. The method of claim 1, further comprising:
   determining, from the received grant, information comprising at least one of a resource allocation for a physical downlink shared channel (PDSCH), a transport block size for the PDSCH, or a bundling size for the PDSCH.

3. The method of claim 2, wherein communicating with the BS comprises monitoring for the PDSCH bundled across one or more subframes in the at least one radio frame based on the determined information.

4. The method of claim 1, further comprising:
   determining, from the received grant, information comprising at least one of a resource allocation for a physical uplink shared channel (PUSCH), a transport block size for the PUSCH, or a bundling size for the PUSCH.

5. The method of claim 4, wherein communicating with the BS comprises transmitting a bundled PUSCH across one or more subframes in the at least one radio frame based on the determined information.

6. The method of claim 1, wherein communicating with the BS comprises participating in a real time service with the BS, wherein the real time service comprises a voice call using voice over Internet protocol (VoIP).

7. A method for wireless communications by a user equipment (UE), comprising:
   receiving, for communications with a base station (BS), in one subframe of a plurality of subframes within at least one radio frame, a grant for bundled downlink transmissions from the BS and bundled uplink transmissions from the UE, wherein the UE is a bandwidth restricted UE operating in a coverage enhancement mode or a power limited mode; and
   communicating with the BS based on the received grant.

8. An apparatus for wireless communications, comprising: at least one processor configured to:
   receive, for communications with a base station (BS), in one subframe of a plurality of subframes within at least one radio frame, a grant for bundled downlink transmissions from the BS and bundled uplink transmissions from the apparatus; and
   communicate with the BS based on the received grant, comprising transmitting a bundled physical uplink shared channel (PUSCH) across one or more subframes in the at least one radio frame based on the grant; and
a memory coupled to the at least one processor.

9. An apparatus for wireless communications, comprising:
means for receiving, for communications with a base station (BS), in one subframe of a plurality of subframes within at least one radio frame, a grant for bundled downlink transmissions from the BS and bundled uplink transmissions from the apparatus; and
means for communicating with the BS based on the received grant, comprising transmitting a bundled physical uplink shared channel (PUSCH) across one or more subframes in the at least one radio frame based on the grant.

10. A non-transitory computer-readable medium for wireless communication by a user equipment (UE), the non-transitory computer-readable medium having computer executable code stored thereon, comprising:
code for receiving, for communications with a base station (BS), in one subframe of a plurality of subframes within at least one radio frame, a grant for bundled downlink transmissions from the BS and bundled uplink transmissions from the UE; and
code for communicating with the BS based on the received grant, comprising transmitting a bundled physical uplink shared channel (PUSCH) across one or more subframes in the at least one radio frame based on the grant.

* * * * *